US011744406B2

(12) United States Patent
Golino et al.

(10) Patent No.: US 11,744,406 B2
(45) Date of Patent: Sep. 5, 2023

(54) FOOD PROCESSING APPARATUS AND METHOD

(71) Applicant: SHARKNINJA OPERATING LLC, Needham, MA (US)

(72) Inventors: Amy L. Golino, Merrimack, NH (US); Vanessa H. Spilios, West Newton, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 102 days.

(21) Appl. No.: 17/072,451

(22) Filed: Oct. 16, 2020

(65) Prior Publication Data

US 2021/0030209 A1 Feb. 4, 2021

Related U.S. Application Data

(63) Continuation of application No. 15/579,856, filed as application No. PCT/US2016/036377 on Jun. 8, 2016, now abandoned.

(60) Provisional application No. 62/172,678, filed on Jun. 8, 2015.

(51) Int. Cl.
*A47J 43/08* (2006.01)
*A47J 43/046* (2006.01)

(52) U.S. Cl.
CPC ........... *A47J 43/085* (2013.01); *A47J 43/046* (2013.01)

(58) Field of Classification Search
CPC ..... B02C 25/00; A47J 43/046; A47J 43/0722; A47J 43/0716
See application file for complete search history.

(56) References Cited

U.S. PATENT DOCUMENTS

| 3,139,917 | A | | 7/1964 | Elmore |
| 3,518,523 | A | * | 6/1970 | Main ....................... H02P 25/14 318/443 |
| 3,548,280 | A | * | 12/1970 | Cockroft ................. H02P 7/295 318/443 |
| 3,856,584 | A | | 12/1974 | Cina |
| 4,541,573 | A | | 9/1985 | Fujiwara et al. |
| 4,649,810 | A | | 3/1987 | Wong |
| 5,071,077 | A | | 12/1991 | Arroubi et al. |
| 5,347,205 | A | | 9/1994 | Piland |

(Continued)

FOREIGN PATENT DOCUMENTS

| AU | 2015243091 A1 | 11/2015 |
| CA | 2382629 A1 | 12/2002 |

(Continued)

OTHER PUBLICATIONS

Cuisinart Recipe Booklet, Archive.org extract of Jul. 10, 2014, 8 Pages. (Year: 2014).*

(Continued)

*Primary Examiner* — Shelley M Self
*Assistant Examiner* — P Derek Pressley
(74) *Attorney, Agent, or Firm* — Burns & Levinson, LLP; Joseph M. Maraia

(57) ABSTRACT

Food processing apparatus and methods for processing food are disclosed. The apparatus may include stored sequences for operating a processing tool. The stored sequences may address various challenging aspects of blending solid foods and/or ice. In some embodiments, particular sequences are implemented with specific processing tools.

27 Claims, 35 Drawing Sheets

(56) References Cited

U.S. PATENT DOCUMENTS

| | | | |
|---|---|---|---|
| 5,435,235 | A | 7/1995 | Yoshida |
| 5,556,198 | A | 9/1996 | Dickson, Jr. et al. |
| 5,819,636 | A | 10/1998 | Khashoggi |
| 5,852,968 | A | 12/1998 | Sundquist |
| 5,967,021 | A | 10/1999 | Yung |
| 6,194,013 | B1 | 2/2001 | Kolar et al. |
| 6,342,260 | B2 | 1/2002 | Kolar et al. |
| 6,364,522 | B2 | 4/2002 | Kolar et al. |
| 6,397,735 | B1 | 6/2002 | Wong |
| 6,402,365 | B1* | 6/2002 | Wong ............ A47J 43/046 366/601 |
| 6,599,006 | B1 | 7/2003 | Lin |
| 6,609,821 | B2 | 8/2003 | Wulf et al. |
| 6,632,013 | B2 | 10/2003 | Wulf et al. |
| 6,758,592 | B2 | 7/2004 | Wulf et al. |
| 6,814,321 | B2 | 11/2004 | Schorn et al. |
| 6,827,476 | B2 | 12/2004 | Lowry et al. |
| 7,520,659 | B2 | 4/2009 | Wulf et al. |
| 7,581,688 | B2 | 9/2009 | Mally |
| 7,591,438 | B2 | 9/2009 | Bohannon, Jr. et al. |
| 7,632,007 | B2 | 12/2009 | Wulf et al. |
| 7,757,984 | B2 | 7/2010 | Lin et al. |
| 7,841,764 | B2 | 11/2010 | Wulf et al. |
| 7,882,734 | B2 | 2/2011 | Ciancimino et al. |
| 7,993,054 | B2 | 8/2011 | Wulf et al. |
| 8,132,752 | B1 | 3/2012 | Hotaling et al. |
| 8,172,451 | B2 | 5/2012 | Li |
| 8,262,005 | B2 | 9/2012 | Garcia |
| 8,292,490 | B2 | 10/2012 | Bohannon, Jr. et al. |
| 8,529,118 | B2 | 9/2013 | Davis et al. |
| 9,049,967 | B1* | 6/2015 | Golino ............ A47J 43/085 |
| 10,201,790 | B2* | 2/2019 | Hoare ............ B01F 35/2209 |
| 2002/0009017 | A1* | 1/2002 | Kolar ............ G07F 13/065 366/206 |
| 2002/0141286 | A1 | 10/2002 | Wulf et al. |
| 2003/0010853 | A1 | 1/2003 | Schorn et al. |
| 2005/0068846 | A1 | 3/2005 | Wulf et al. |
| 2005/0152215 | A1 | 7/2005 | Stuart et al. |
| 2008/0223963 | A1 | 9/2008 | Mally |
| 2008/0225636 | A1 | 9/2008 | Kolar |
| 2009/0067279 | A1 | 3/2009 | Mulle et al. |
| 2009/0168593 | A1 | 7/2009 | Wulf et al. |
| 2009/0285958 | A1 | 11/2009 | Garcia |
| 2012/0018561 | A1 | 1/2012 | Wulf et al. |
| 2012/0024995 | A1 | 2/2012 | Audette |
| 2012/0325948 | A1 | 12/2012 | Garcia et al. |
| 2013/0003490 | A1 | 1/2013 | Kemker et al. |
| 2013/0033957 | A1 | 2/2013 | Huang |
| 2013/0134246 | A1 | 5/2013 | Gushwa |
| 2013/0192477 | A1 | 8/2013 | Hoare et al. |
| 2014/0374519 | A1* | 12/2014 | Davis ............ A23G 9/045 241/101.8 |
| 2015/0117137 | A1* | 4/2015 | Haney ............ A47J 19/027 366/205 |
| 2015/0164281 | A1 | 6/2015 | Koetz et al. |
| 2016/0037970 | A1 | 2/2016 | Golino et al. |
| 2016/0038947 | A1 | 2/2016 | Golino |
| 2016/0331182 | A1 | 11/2016 | Golino |

FOREIGN PATENT DOCUMENTS

| | | |
|---|---|---|
| CN | 1526086 A | 9/2004 |
| CN | 101282672 A | 10/2008 |
| CN | 101869441 A | 10/2010 |
| CN | 201996377 U | 10/2011 |
| CN | 202146240 U | 2/2012 |
| CN | 202223073 U | 5/2012 |
| DE | 102009030132 A1 | 12/2010 |
| DE | 102013106691 A1 | 1/2014 |
| EP | 2556778 A1 | 2/2013 |
| EP | 2730203 A1 | 5/2014 |
| GB | 2424081 A | 9/2006 |
| JP | S55138426 A | 10/1980 |
| JP | S5728575 A | 2/1982 |
| JP | S58003137 U | 1/1983 |
| JP | S5928935 A | 2/1984 |
| JP | S5946924 A | 3/1984 |
| JP | H03186235 A | 8/1991 |
| JP | 06046918 A | 2/1994 |
| JP | H1014811 A | 1/1998 |
| JP | 2003019076 A | 1/2003 |
| JP | 2003126710 A | 5/2003 |
| JP | 2005177339 A | 7/2005 |
| JP | 3986893 B2 | 10/2007 |
| JP | 2010005377 A | 1/2010 |
| WO | 03007093 A2 | 1/2003 |
| WO | 2006070980 A1 | 7/2006 |
| WO | 2013016533 A1 | 1/2013 |

OTHER PUBLICATIONS

The Science of Blenders; https://www.youtube.com/watch?v=iCmjZboscPM&t=18s, Mar. 12, 2013, Retrieved from YouTube Oct. 19, 2022, 1 Page. (Year: 2013).*

European Search Report dated May 19, 2021 for EP Application No. EP 21 16 0751, 1 pg.

Australian Office Action; International Application No. 2016276447; International Filing Date: Nov. 15, 2017; dated Apr. 22, 2020; 3 pages.

Chinese Office Action; International Application No. 201680033239.6; International Filing Date: Dec. 7, 2017 dated Apr. 13, 2020; 9 pages.

Japanese Office Action; International Application No. 2017-562293; International Filing Date: Nov. 30, 2017 dated Apr. 1, 2020; 6 pages.

Japanese Office Action; International Application No. 2017-562293; International Filing Date: Nov. 30, 2017 dated Nov. 17, 2020; 5 pages with translation.

Korean Office Action; Interational Application No. 10-2020-0024544; International Filing Date: Feb. 27, 2020; dated Jul. 9, 2020; 3 pages.

Korean Office Action; International Application No. 10-2017-0076704; International Filing Date: Jun. 10, 2017; dated Nov. 28, 2019; 3 pages.

[No. Author Listed] Blendtec Classic Series. Owner's Manual and User Guide. 2014. 15 pages.

[No. Author Listed] Blendtec Designer Series. Owner's Manual and User Guide 2014 20 pages.

[No. Author Listed] Blendtec Total Blender Owner's Manual and User Guide 2011. 15 pages.

[No. Author Listed] Breville. The Hemisphere Control BBL605XL. Instruction Book. 2011. 69 pages.

[No Author Listed] NutriBullet RX is Nuture's Prescription for Optimum Health. Presss Release. Aug. 19, 2014. Available at http://www.streetinsider.com/Press+Releases/NutriBullet+Launches+the+Next+Generation+of+Nutrition+Extraction%3A+The+Nutribullet+RX/9764851.html. Last Accessed Sep. 29, 2014.

[No Author Listed] Nutribullet User Guide & Recipe Book. 166 pages. Known publicly prio to Aug. 8, 2014.

[No Author Listed] Oster Versa Performance Blender User Manual 2014. 21 pages.

AU Notice of Acceptance for Patent Aplication; AU Application No. 2015243091, dated Dec. 13, 2016, pp. 1-3.

China National Intellectual Property Administration, Fourth Office Action for Application No. 201410542931.4, dated Oct. 15, 2018 (8 pp.).

CN Office Action Translation; Chinese Application No. 201410542931.4; dated Mar. 27, 2017; 9 Pages.

CN Office Action Translation; Chinese Application No. 201410542931.4; dated Aug. 15, 2017; 10 Pages.

CN Office Action with Search Report and Translation; Chinese Application No. 201410542931.4; dated Sep. 20, 2016; 19 Pages.

Decision of Rejection Translation; Japanese Patent Application No. 2015-095778; dated May 2, 2016; 3 Pages.

European Patent Office, Communication Pursuant to Article 94(3) EPC for Application No. 16 730 193.6-1006, dated Nov. 22, 2018 (4 pp.).

(56) References Cited

OTHER PUBLICATIONS

Examination Report; Canadian Application No. 2,890,724; dated Feb. 15, 2016; 3 Pages.
Extended Search Report; European Application No. 15167419.9; dated Nov. 6, 2015; 8 Pages.
Final Rejection and Notice of Appeal Translation; Korean Application No. 10-2015-0069534; dated Dec. 29, 2016; 8 Pages.
First Examination Report; New Zealand Application No. 707934; dated Aug. 19, 2015; 6 Pages.
Japanese Publication No. S5728575 (B2); Publication Date: Jun. 17, 1982; English Translation; 10 Pages.
Japanese Publication No. S583137 (U); Publication Date: Jan. 10, 1983; English Translation; 16 Pages.
Notice of Allowance; Canadian Application No. 2,890,724; dated May 27, 2016; p. 1-1.
Notice of Allowance; New Zealand Application No. 707934; dated Jun. 22, 2016; pp. 1-1.
Notice of Preliminary Rejection; Korean Application No. 10-2015-0069534; dated Nov. 17, 2015; 3 Pages.
Notice of Reasons for Rejection; Japanese Patent Application No. 2015-095778; dated Sep. 8, 2015; 4 Pages.
Notice of Second Final Rejection Translation; Korean Application No. 10-2015-0069534; dated May 16, 2017 6 Pages.
Notification of Making Rectification; Chinese Application No. 201420593895.X; dated Jan. 6, 2015; 4 Pages.
Patent Examination Report No. 1; Australian Application No. 2015243091; dated May 18, 2016; 6 Pages.
PCT International Preliminary Report on Patentability; International Application No. PCT/US2016/036377; International Filing Date: Jun. 8, 2016; dated Dec. 12, 2017, pp. 1-7.
PCT Notification of Transmittal of the International Search Report; International Application No. PCT/US2016/036377 International Filing Date: Jun. 8, 2016; dated Sep. 9, 2016; pp. 1-6.
PCT Written Opinion of the International Searching Authority; International Application No. PCT/US2016/036377 International Filing Date: Jun. 8, 2016; dated Sep. 9, 2016, pp. 1-6.
U.S. Non-Final Office Action; U.S. Appl. No. 15/579,856; Application Filing Date: Dec. 5, 2017; dated Oct. 29, 2019; 53 pages.

* cited by examiner

FOOD PROCESSING APPARATUS AND METHOD

CROSS REFERENCE TO RELATED APPLICATIONS

This application is a continuation of U.S. Non-Provisional application Ser. No. 15/579,856 filed Dec. 5, 2017, which is a National Stage application of PCT/US2016/036377, filed Jun. 8, 2016, which claims the benefit of U.S. Provisional Application No. 62/172,678, filed Jun. 8, 2015, all of which are incorporated by reference in their entirety herein.

FIELD

Aspects herein generally relate to a food processing apparatus and to a method of processing food using a food processing apparatus. More specifically, aspects disclosed herein relate to a food processing apparatus having stored sequences that can be used to prepare various foods in an effective and convenient manner.

DISCUSSION OF RELATED ART

Blenders and other food processors are typically used to chop, blend, mix, or pulverize food, crush ice, mix liquids, and blend liquid and solid food together using blades or other processing tools. Typically, the processing tools are rotated at various speeds within a container.

SUMMARY

According to one illustrative embodiment, a food processing apparatus includes a container including at least one rotatable, sharp blade, a drive unit having a drive coupler to rotate the at least one blade, and a controller to control the drive unit. The apparatus also includes at least one non-transitory memory storing processor-executable instructions that, when executed by the controller, cause the controller, in response to a first user input, to sequentially: activate the drive unit for three seconds or less to rotate the drive coupler as a first pulse; pause the drive unit for at least one second; activate the drive unit for three seconds or less to rotate the drive coupler as a second pulse; pause the drive unit for at least one second; activate the drive unit for at least five seconds to rotate the drive coupler as a first blending segment; pause the drive unit for at least one second; activate the drive unit for at least five seconds to rotate the drive coupler as a second blending segment; pause the drive unit for at least one second; and activate the drive unit for at least five seconds to rotate the drive coupler as a third blending segment. A total time period of all activations of the drive unit that are at least five seconds for blending segments is at least twenty-three seconds.

According to yet one illustrative embodiment, a food processing apparatus includes a container including at least one rotatable, sharp blade, a drive unit having a drive coupler to rotate the at least one blade, and a controller to control the drive unit. The apparatus also includes at least one non-transitory memory storing processor-executable instructions that, when executed by the controller, cause the controller, in response to a first user input, to sequentially: activate the drive. unit for three seconds or less to rotate the drive coupler as a first pulse; pause the drive unit for at least one second; activate the drive unit for three seconds or less to rotate the drive coupler as a second pulse; pause the drive unit for at least one second; activate the drive unit for three seconds or less to rotate the drive coupler as a third pulse; pause the drive unit for at least one second; activate the drive unit for at least five seconds to rotate the drive coupler as a first blending segment; pause the drive unit for at least one second; and activate the drive unit for at least five seconds to rotate the drive coupler as a second blending segment. A total time period of all activations of the drive unit that are at least five seconds for blending segments is at least nineteen seconds.

According to still one illustrative embodiment, a food processing apparatus includes a container including at least one rotatable, sharp blade, a drive unit having a drive coupler to rotate the at least one blade, and a controller to control the drive unit. The apparatus also includes at least one non-transitory memory storing processor-executable instructions that, when executed by the controller, cause the controller, in response to a first user input, to sequentially: activate the drive unit for three seconds or less to rotate the drive coupler as a first pulse; pause the drive unit for at least one second; activate the drive unit for three seconds or less to rotate the drive coupler as a second pulse; pause the drive unit for at least one second; activate the drive unit for at least five seconds to rotate the drive coupler as a first blending segment; pause the drive unit for at least one second; activate the drive unit for three seconds or less to rotate the drive coupler as a third pulse; pause the drive unit for at least one second; activate the drive unit for at least five seconds to rotate the drive coupler as a second blending segment; pause the drive unit for at least one second; and activate the drive unit for at least five seconds to rotate the drive coupler as a third blending segment. A total time period of all activations of the drive unit that are at least five seconds for blending segments is at least fifty-two seconds.

According to still one illustrative embodiment, a food processing apparatus includes a container including at least one rotatable, sharp blade, a drive unit having a drive coupler to rotate the at least one blade, and a controller to control the drive unit. The apparatus also includes at least one non-transitory memory storing processor-executable instructions that, when executed by the controller, cause the controller, in response to a first user input, to sequentially: activate the drive unit for three seconds or less to rotate the drive coupler as a first pulse; pause the drive unit for at least one second; activate the drive unit for three seconds or less to rotate the drive coupler as a second pulse; pause the drive unit for at least one second; activate the drive unit for three seconds or less to rotate the drive coupler as a third pulse; pause the drive unit for at least one second; activate the drive unit for at least five seconds to rotate the drive coupler as a first blending segment; pause the drive unit for at least one second; activate the drive unit for three seconds or less to rotate the drive coupler as a fourth pulse; pause the drive unit for at least one second; activate the drive unit for three seconds or less to rotate the drive coupler as a fifth pulse; pause the drive unit for at least one second; activate the drive unit for at least five seconds to rotate the drive coupler as a second blending segment; pause the drive unit for at least one second; and activate the drive unit for at least five seconds to rotate the drive coupler as a third blending segment. A total time period of all activations of the drive unit that are at least five seconds for blending segments is at least forty-seven seconds.

According to another illustrative embodiment, a method is used in connection with operation of a food processing apparatus, the apparatus comprising a drive unit to drive a food processing assembly, a controller to control the drive unit, and at least one non-transitory memory storing processor-executable instructions that are executable by the controller to cause the controller to control the drive unit. The method includes, in response to a first user input, sequentially: activating the drive unit for three seconds or less to rotate the drive coupler as a first pulse; pausing the drive unit for at least one second; activating the drive unit for three seconds or less to rotate the drive coupler as a second pulse; pausing the drive unit for at least one second; activating the drive unit for at least five seconds to rotate the drive coupler as a first blending segment; pausing the drive unit for at least one second; activating the drive unit for at least five seconds to rotate the drive coupler as a second blending segment; pausing the drive unit for at least one second; and activating the drive unit for at least five seconds to rotate the drive coupler as a third blending segment. A total time period of activating of the drive unit that are at least five seconds for blending segments is at least twenty-three seconds.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
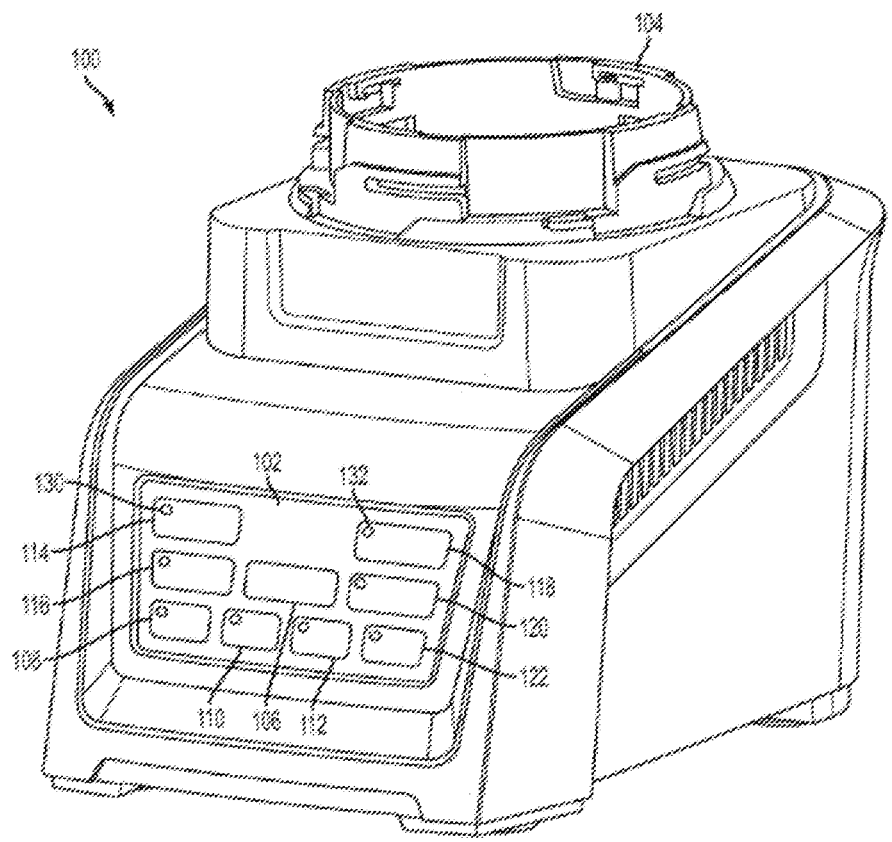
FIG. 1 is a perspective view of a blender base in accordance with one aspect.

Food processors, such as a blender, typically include a processing tool, such as a blade or blades, within a container, and an electric motor which rotates the processing tool via a drive coupling. Some food processors include a programmed controller which allows a user to select a specific, stored sequence of motor operation to rotate the blades. The inventors have appreciated that existing sequences have limitations, especially when attempting to process low liquid and/or fibrous foods with minimal or no user intervention.

According to aspects of embodiments disclosed herein, a processing sequence is particularly suited to processing food mixtures which include solid components. For example, a processing sequence includes a short run of a blade or blades to initially chop food and/or break down fibers, skins, seeds, and/or ice. After at least one pause to allow the food to fall toward the bottom of the container and/or toward the blade path, the sequence proceeds to a continuous processing time segment of at least five seconds to crush and/or start liquefying the ingredients. At least another pause follows, and then a further continuous segment of at least five seconds to liquefy the contents of the container. By using such a sequence, smooth liquids may consistently be created even when blending ingredients which are difficult to liquefy. In some embodiments, the breakdown of fibrous ingredients helps to create a drink which has a smooth consistency and includes extracted nutrients. Longer times may be used in some embodiments. For example, in some embodiments, the total processing time of the longer blending segments may be at least twenty seconds. In some embodiments, the pause segments include a stoppage of the blade, while in other embodiments, the pause embodiments include the blade slowing to an rpm of 100 rpm or less.

According to another aspect of embodiments disclosed herein, a food processing apparatus is programmed to include an act of causing blended components to move along an inner side wall of the blender container upwardly toward the upper end of the blender container, to remove ingredients that may be caught on the inner wall of the container, or even on the underside of a lid of the container. In this manner, ingredients stuck on the inner side wall and/or lid may be returned to the blended mixture and processed with the blades.

For example, when processing foods, especially leafy greens or other foods with a high ratio of surface area to weight, food portions may be propelled toward the upper end of the container and stick to the inner walls, especially during the early stages of a sequence when solid food has not yet been chopped into small pieces. According to embodiments herein, after sufficient blending has occurred to at least partially liquefy the contents within the container, the blades or other processing tool may be stopped or slowed to a speed at which the liquid slows down and is substantially level within the container. The blades then may be quickly accelerated to drive the liquid outwardly and upwardly along the inner walls of the container. The liquid contacts the items caught on the container walls and dislodges them so that they fall back into the mixture being blended. In some embodiments, the motor is instantaneously powered with full power to accelerate the blades.

The inventors have appreciated that in certain circumstances, providing control of one or more specific parameters to a user during the operation of a program can permit improved food processing results.

For example, according to one embodiment disclosed herein, a programmed food processing sequence includes a series of on/off pulses. That is, the blades are driven for an amount of time, then stopped for an amount of time, again driven for an amount of time, and then stopped. This sequence may be repeated any suitable number of times and can be helpful for initially chopping solid food ingredients, and then letting the ingredients move toward the bottom of the container and/or toward the horizontal center of the container while the blades are stopped. In this manner, when the blades are restarted, more of the ingredients are within reach of the blades and/or in an area where they will be drawn toward the blades. According to embodiments herein, while the amount of time that the one or more blades (or other processing tool) are driven is set by the program and not alterable by the user during operation, the user is able to choose a suitable amount of time for each "off" time period while operating the blender. This particular arrangement is unlike typical programmed blenders which have preset amounts of time for both the "on" periods and the and "off" periods which the user cannot modify during operation.

The inventors have appreciated that when manually pulsing a blender, users often keep the motor on for too long, which can result in blending rather than chopping or pulverizing. The inventors have also appreciated that programming a blender controller with a suitably long pulse sequence to accommodate a range of ingredient mixtures can lead to "off" time periods which are unnecessarily long in some circumstances. In certain embodiments disclosed herein, a programmed pulse sequence includes preset "on" times, followed by a default "off" time which a user can shorten in any suitable manner, for example by letting go of a button and then re-pressing the button. A second, preset "on" time follows the "off" time. In this manner, the programmed blender can prevent overly long "on" times while also avoiding overly long "off" times.

According to another aspect of the disclosure, processing sequences particularly suited for pureeing foods are disclosed herein. According to one embodiment, a blender starts a sequence by reaching a steady-state low rotational blade speed, and after at least five seconds at the low speed, increases to a steady-state medium rotational blade speed, and after at least five seconds at the medium speed, increases to a steady-state high speed. In some embodiments, the high speed continues for an amount of time that is longer than the low speed and medium speed times combined. Such a sequence provides initial segments which break down ingredients such that during the high speed segment, cavitation can be avoided while running at a speed that efficiently creates a smooth texture.

In some embodiments, the progression of speeds for pureeing is performed in conjunction with a set of stacked blender blades which each have a substantially flat arrangement and a curved leading edge. The sequence may be configured such that the blade speed does not fall below any prior steady-state blade speed until the end of the steady-state high blade speed time period.

Particular stored sequences may be indicated as being available for use via indicators associated with stored sequence buttons. In some embodiments, particular stored sequences may be useable only with one or more types of containers. To indicate the availability of stored sequences for a particular container attached at a given time, the food processor may be configured to determine which type of container is attached, and a visual cue may be provided to the user as to which stored sequence(s) may be used. For example, in one embodiment, a controller illuminates a light associated with a specific button to indicate that the stored sequence (or other functionality) corresponding to that button (or other input) may be used. The button may have a particular sequence name or functionality name printed on or near the button.

According to another aspect of embodiments disclosed herein, a same button, or other input, may be used to initiate different stored sequences depending on what type of container is attached to the food processing apparatus.

Control Panel

FIG. 1 shows one embodiment of a blender base 100 with a control panel 102 and a container interface 104 for attaching a container to the base. The blender base 100 includes a drive unit (not shown), such as an electric motor and a drive coupler which can be mated to a driven coupler on an attached container. A controller (not shown in FIG. 1) is included for controlling the drive unit, in some cases to execute stored sequences of motor operation.

The control panel includes a number of buttons 106, 108, 110, 112, 114, 116, 118, 120, and 122 in the illustrated embodiment, though any suitable structure for receiving user input may be utilized. Button 106 is an on/off button which allows the user to activate or deactivate the control panel. When the control panel is deactivated, the motor is not powered.

Button 108 activates the motor to run at a "low" speed by supplying a certain amount of power to the electric motor. The actual speed of the motor and hence the speed of the blades or other processing tool may vary based on the type and consistency of food within the container. In some embodiments, a feedback control may be provided which senses the speed of the motor or other components and adjusts the electric power to maintain a certain speed or speed profile. In some embodiments, for example, in personal serving containers, a target motor rotational speed of approximately 7,000 rpm is activated by the button 108 with the container substantially full of liquefied food. Similarly, button 110 activates a medium speed, which may be an approximate target rotational speed of 9,000 rpm in some embodiments with the container substantially full of liquefied food. Button 112 activates a high speed, which may be an approximate target rotational speed of 11,000 rpm in some embodiments with the container substantially full of liquefied food.

Buttons 114, 116, 118, 120 activate stored sequences according to embodiments disclosed herein. In some cases, a stored sequence is designed to be particularly well suited for a class of food preparation and/or particular ingredients or types of ingredients. The particular stored sequence that is activated by a given button may vary depending on the type of container that is attached to the blender base so that the food preparation may be enhanced further.

For example, in the illustrated embodiment, button 114 activates a sequence of motor control which rotates a set of blades to produce frozen drinks having a high degree of ice pulverization in an efficient manner. The particular sequence may vary depending on the size and/or type of container attached to the blender base. Button 116 invokes a sequence particularly well suited for preparing purees, as described further below with reference to FIGS. 8, 9 and 10. Button 120 allows a user to select a stored sequence which targets the processing of frozen food items. A stored sequence aimed at blending fresh foods is activated with button 118. In some embodiments, by pressing a single button once, a user can process foods that might typically require user intervention.

Button 122 activates a pulse sequence, which in some embodiments may permit a user to alter the sequence while the blender is operating according to the pulse sequence. For example, in some embodiments, the button 122 may be used to activate a series of pulses where the motor is on for a set amount of time, but the length of time that the motor is off is adjustable by the user while pulsing.

Sequence Indicators

One or more of the buttons may include a light or other indicator to show that the respective button will initiate a function if actuated. For example, a light 130 may be illuminated on button 114 indicating that the frozen drinks sequence available for operation. If pressing button 114 will not result in motor activation, light 130 will not be illuminated. The illumination status of light 130 may be based on the type of container attached to the blender base or any other suitable parameter. For example, the food processing apparatus may include a weight sensor and/or a temperature sensor, and the availability of a given sequence or other function may be based on the measurements received from one or both sensors.

Personal Serving Embodiment

Figure 2:
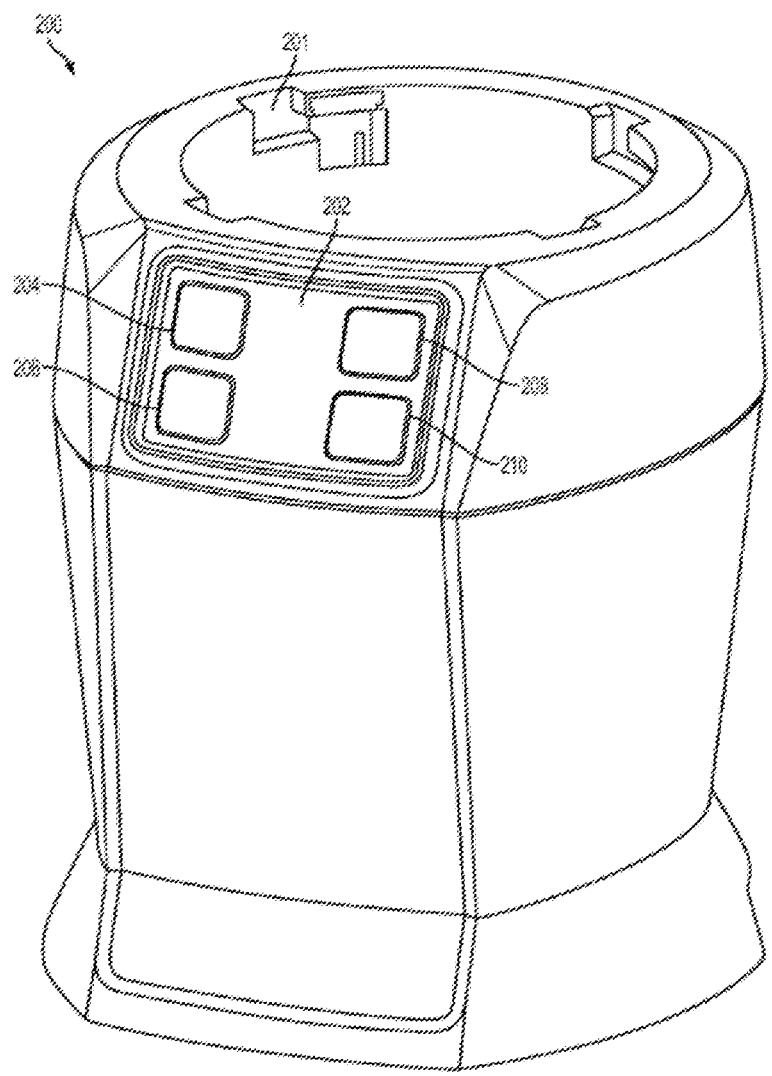
FIG. 2 is a perspective view of a blender base in accordance with one aspect.

FIG. 2 shows another embodiment of a blender base 200 having a container interface 201 and a control panel 202 with a different arrangement of buttons as compared to the embodiment of FIG. 1. Blender base 200 may be used with a personal serving container as shown by way of example in FIG. 3. A button 204 may be used to start and stop the motor. A button 206 is used to initiate a pulse sequence, which in some embodiments permits a user to alter a length of a pauses between motor activations. A button 208 may be used to start a sequence directed at processing frozen food items. Fresh food items may be processed using a stored sequence initiated by a button 210.

Other arrangements of buttons or other inputs may be used with any of the various embodiments disclosed herein. For example, dials, flip switches, rotary knobs, slide knobs, voice-activated commands, virtual keyboards, or any other suitable input may be used.

Motor

The motor contained within blender base 200 of FIG. 2 may be rated at 1,000 watts in some embodiments, though any suitable motor may be used. In some embodiments, the motor may be run at full power, while in other embodiments, the motor may be run at less than full power, even when on a "high" setting. The motor may be configured to run at approximately 20,000 RPM when unloaded. In some embodiments, the motor can be run with different power inputs for different sequences or run at different power inputs within a single sequence. In other embodiments, the motor is run with the same power input for all stored sequences.

The motor contained within blender base 100 of FIG. 1 may be rated at 1,500 watts in some embodiments, though any suitable motor may be used. The motor may be run at least than full power at times. For example, the motor may be run at 85% of full power, or any other suitable percent of power in some embodiments, when being operated with the personal serving container shown in FIG. 3 and a "high" setting is selected by the user or is part of a stored sequence. See FIG. 24 for one embodiment of a personal serving container mounted to the base of FIG. 1. With a 1,500 watt motor, the 85% power input results in a rotation speed of approximately 21,500 rpm when unloaded. For medium settings, the motor may be supplied with 80% power input, resulting in a rotation speed of approximately 20,000 rpm when unloaded. For low settings, the motor may be supplied with 60% power input, resulting in a rotation speed of approximately 15,000 rpm when unloaded. When used with the container shown in FIG. 31, the motor may be run at 100% power, and rotate at approximately 24,000 rpm when unloaded. Any suitably sized motor and/or power input may be used in various embodiments.

For purposes herein, when a motor speed, processing tool speed, or drive coupler speed is discussed, a constant speed is not necessarily required. The speed may vary slightly over time as a result of intended changes to the power which is provided to the motor. Or, the speed may vary as a result of the food contents being processed in the container. For example, in some embodiments, a motor may be supplied with 85% of its full rated power, and the motor and blades may initially rotate at 8,000 rpm under the load of the unprocessed food in the container. As the food is processed, the blades become easier to rotate, and the motor speed may increase to 13,000 rpm even though the same amount of power is being supplied to the motor.

Personal Serving Container

Figure 3:
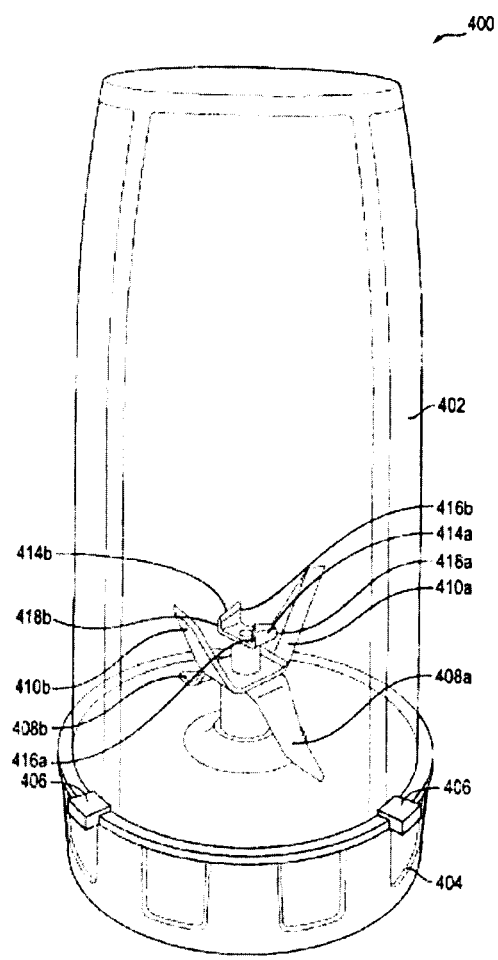
FIG. 3 is a perspective view of a container with an attached blade assembly in accordance with one aspect.

FIG. 3 shows a container assembly 400 including a container 402 and a container base 404 which is removably attachable to the container 402 with threads (not shown). Container 402 includes four equally spaced engagement members, such as tabs 406 (only two are shown in FIG. 3) which engage with slots in an associated blender base. In some embodiments, the tabs or other engagement members extends from the container base 404 instead of the container 402. Container 402 may be used to prepare personal serving sizes which can be consumed directly from the container.

A processing assembly, such as a shaft supporting six blades 408a, 408b, 410a, and 410b is positioned within the container when the container base 404 is attached to the container. A driven coupler (not shown in FIG. 3) is positioned on the underside of the container base to rotate the blades when attached to a blender base.

Figure 4:
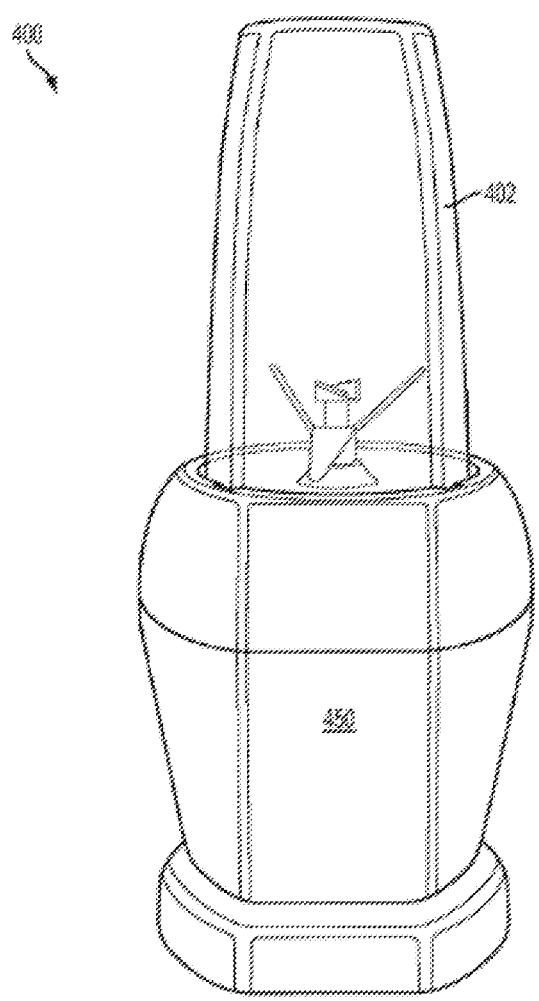
FIG. 4 is a perspective view of the container of FIG. 3 attached to a blender base in accordance with one aspect.

The container assembly 400 is shown in FIG. 4 mounted to a blender base 450. The blender base 450 includes a motor which rotates a drive coupler (not shown in FIG. 4), which in turn rotates the blades 408a, 408b, 410a, and 410b via the driven coupler on container base 404.

Blades which are parallel to the axis of rotation, such as vertical blades 414a, 414b, may be included in some embodiments. Vertical blades 414a, 414 b include upwardly facing sharp edges 414a, 414b in some embodiments, and these sharp edges may be slanted relative to horizontal (or slanted relative to a plane that is perpendicular to the axis of rotation). Vertical blades 414a, 414b may oriented such that when rotated, the blades lead with taller side edges 416a, 416b. In other embodiments, the vertical blades 414a, 414b may be oriented to lead with short side edges 418a, 418b. The upwardly facing edges may not be sharp in some embodiments. The vertical blades 414a, 414b may be used with various blending sequences or other food processing sequences described herein. In particular, these blades may be used with sequences which are particularly well suited to process ice or frozen foods.

As used herein, the term "processing tool" refers to any tool used to process foods and other materials. A processing tool may include, but is not limited to, one or more blades, one or more whisks, one or more ice crushers, one or more dicers, one or more graters, one or more shredders, one or more combined shredder/slicers, one or more cubers, one or more dough hooks, one or more whippers, one or more slicers, and one or more french fry cutters. In some cases, a processing tool may be one or more tools that are used to clean the food processor container. As used herein, the term "food" includes any solid or liquid comestible, and any mixture of a solid food and a liquid food.

While blender bases are shown and described herein as being positioned under a container such that the base supports the container, in some embodiments, the base may comprise a drive unit which is configured to mount to the top of a container. In other words, for purposes herein, a blender base is not required to be positionable under a container or to support a container.

Stored Sequences

The inventors have appreciated that conventional food processing sequences do not provide desirable results when used with various foods and food combinations. For example, with fibrous ingredients, solid foods with a low liquid content, and/or larger pieces of solid foods, various conventional processing sequences may result in cavitation. That is, in some cases, with food packed into the container, the blades are rotated, and the blades manage to cut through the food that is within the blade path, but without liquid to move the solid ingredients, minimal further processing occurs. To address this issue, users have typically been instructed to add liquid to the container, and/or a use a pusher to periodically push unprocessed food into the blade path, but each method has its drawbacks.

According to embodiments disclosed herein, certain processing sequences are capable of processing foods without user intervention and without the addition of extra liquids—including foods which typically have been difficult to process without user intervention. By doing so, users may be able to include foods in their recipes which they otherwise might avoid only because of the processing difficulties. With the sequences disclosed herein, users also may be able to include the skins of foods that they previously tended to remove. Skins are important when trying to include fiber and nutrients in a final, blended product.

Figure 5:
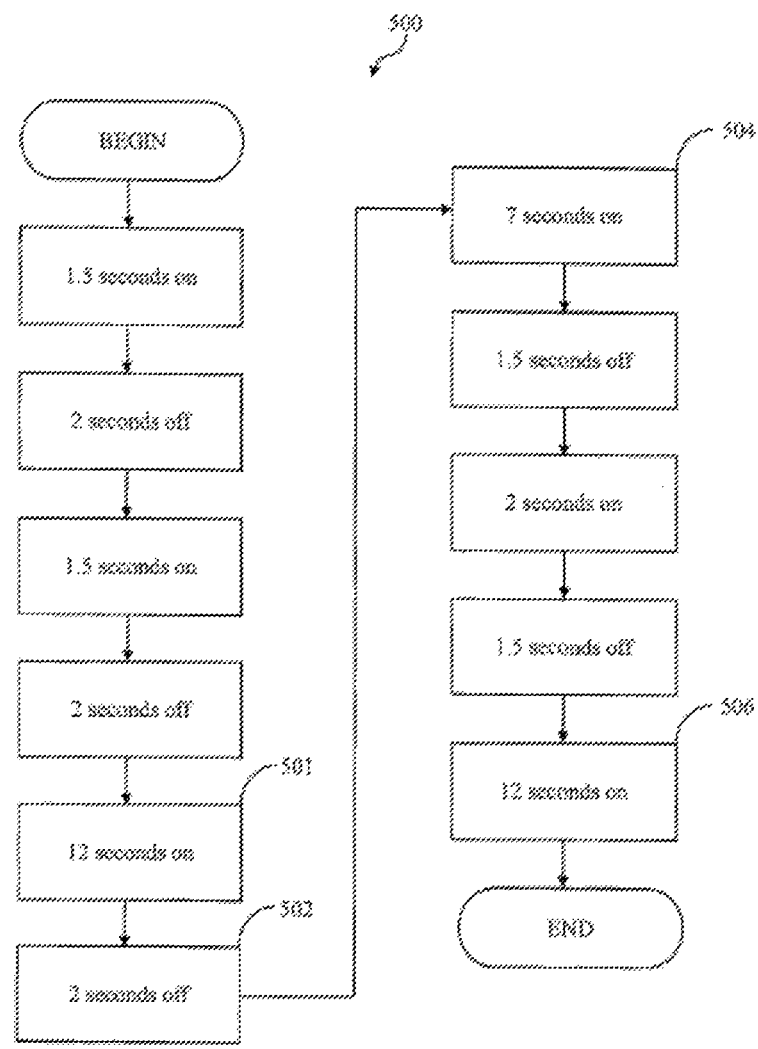
FIG. 5 is a flow chart of an illustrative food processing sequence in accordance with one aspect.

One embodiment of a stored sequence 500 which may be used to blend foods, and especially foods or food combinations which resist processing with a blender, is illustrated in FIG. 5. This sequence may be used with the personal serving container shown in FIGS. 3 and 4 along with the blades shown in the same figures, though any suitable container and processing tool combination may be used with this sequence.

The sequence 500 of FIG. 5 starts with two repetitions of pulse segments of 1.5 seconds on and two seconds off, followed by a first continuous run segment 501 of twelve seconds. By including short "on" segments with interspersed "off" segments (or pause segments with slow rotations) early in the sequence, initial chopping and/or liquefaction is performed without resulting in cavitation. The process of accelerating the blades can move ingredients within the container, while the "off" segments allow gravity to move solids and liquids into the blade path such that upon restart, these foods are contacted by the blades. This additional contact not only processes the contacted food, but also uses the contacted food to move other food within the container. Accordingly, the pulse segments at or near the beginning of the sequence begin to liquefy some of the softer foods and move around and chop some of the harder foods. If the blades are simply turned on and run continuously at high speed from the start of the sequence, solid food which starts to fall into the blade path is incrementally contacted by the blades, and the resulting small bits of food are not as good at moving other foods.

The continuous run segment 501 of twelve seconds starts processing the rougher ingredients and continues processing and liquefying the softer foods to start creating a smooth liquid.

The sequence includes an "off" segment 502 and an immediately subsequent rapid acceleration "on" segment 504 to cause liquids and solids to surge briefly upwardly along an inner side wall of the blender container toward the upper end of the blender container. This portion of the sequence uses the liquefied material in the blender container to recapture ingredients that may be caught on the inner wall of the container or the underside of the container lid so that the ingredients may be returned to the blades or other processing tool. For purposes herein, such action is referred to as a fountain effect sequence. The fountain effect sequence is discussed in more detail further below.

Segment 504 is seven seconds long to continue processing the ingredients for a smooth texture. Any ingredients recaptured by the fountain effect segments are liquefied and processed during segment 504.

Two more "off" and rapid acceleration "on" segments follow segment 504 to again attempt to recapture any foods that have become stuck on the inner walls or the lid underside. A final segment 506 runs continuously for twelve seconds to achieve a final smoothness and to process any foods recaptured during the final fountain effect segments.

The precise times disclosed in this particular sequence are not necessarily required, and may be varied depending on the motor power, blade speed, type of food(s) to be processed, etc. For example, in some embodiments, the first continuous run segment 501 may be at least five seconds, at least seven seconds, at least ten seconds, at least fifteen seconds, or any other suitable length. The second continuous run segment 504 may be at least five seconds, seven seconds, ten seconds, fifteen seconds, or any other suitable length. In some embodiments, the sequence may end after the second continuous run segment 504. Where the third continuous run segment 506 is included, it may be at least five seconds, seven seconds, ten seconds, fifteen seconds, or any other suitable length. Additional sequential, short "on" and "off" segments may be included before, between, or after the various continuous run segments in some embodiments. For example, in sequence 500, additional short "on" and "off" segments may be included between immediately sequential segments 502 and 504, resulting in a sequence in which sequential segments 501 and 504 include several short "on" and "off" segments between them.

In some embodiments of blend sequences similar to sequence 500, the total amount of all "on" time periods may be at least twenty-five seconds, at least twenty-nine seconds, at least thirty-six seconds, or any other suitable length. The total time period of the entire sequence may be no more than fifty seconds in some embodiments, no more than forty-five seconds in some embodiments, or limited to any other suitable time period.

For purposes herein, the term "pause" as part of a sequence of food processing apparatus operation refers both to: a) not activating the drive unit for a period of time, and b) activating the drive unit at a level for a period of time such that if the processing tool were to reach a steady state speed based on the average activation level provided to the drive unit over the period of time, the processing tool would have a speed of 100 rpm or less. For example, a blending sequence which includes a 2.5 second time period during which electricity is not provided to the motor is considered to have a 2.5 second pause segment, even though the processing tool may not immediately stop rotating when the motor is de-energized. As another example, a pause segment may include a motor driven at 300 rpm for three seconds, which, through a transmission, results in a steady state processing tool speed of 60 rpm. Even though the processing tool does not have a speed of 60 rpm from the start of the three second time period, the segment is still considered to be a three second pause. As another example, for two seconds, a motor may be cyclically powered to between two power levels which results in the drive unit and blades rotating from between 10 rpm and 20 rpm, with an average speed of 15 rpm over the two second time period. Such a time period would be considered a pause for purposes herein.

Many of the sequence embodiments described and illustrated herein refer to an "off" time period. An "off" time period, for purposes herein, means a time period during which the drive unit is not activated, though the drive unit may continue to rotate during some or all of the "off" period due to residual momentum. However, anytime that an "off" period is referred to herein, a "pause" segment may be implemented instead. For example, segment 502 of FIG. 5 may be a two second pause instead of a two second "off" segment. As discussed above, a pause segment may include slow rotations of a processing tool or may include a shut-off of the drive unit (such as a motor).

Figure 6:
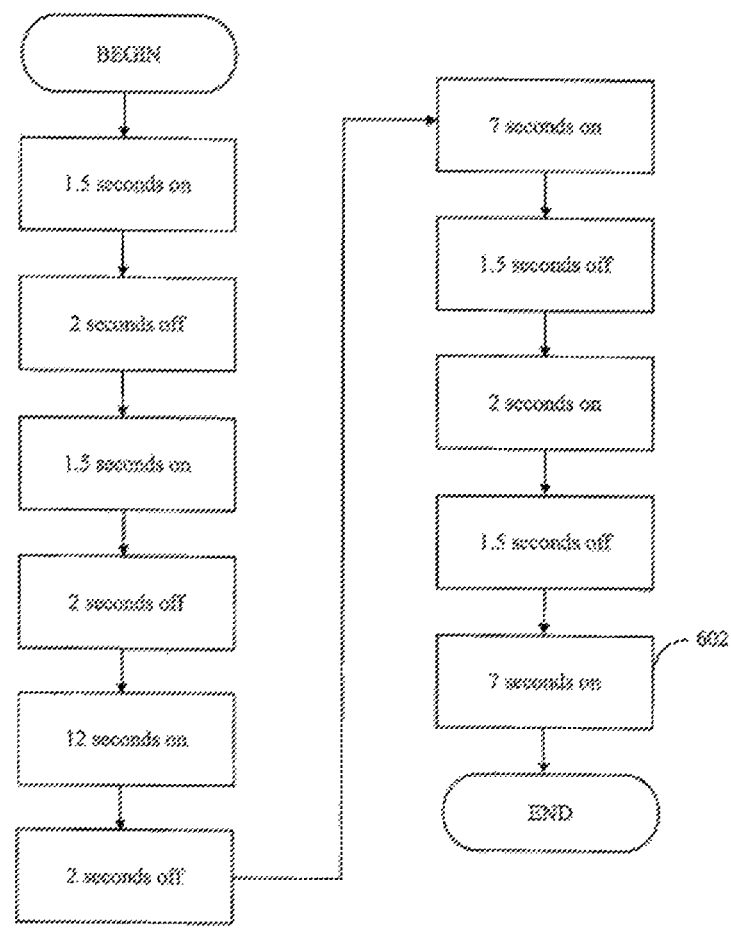
FIG. 6 is a flow chart of an illustrative food processing sequence in accordance with one
Figure 7:
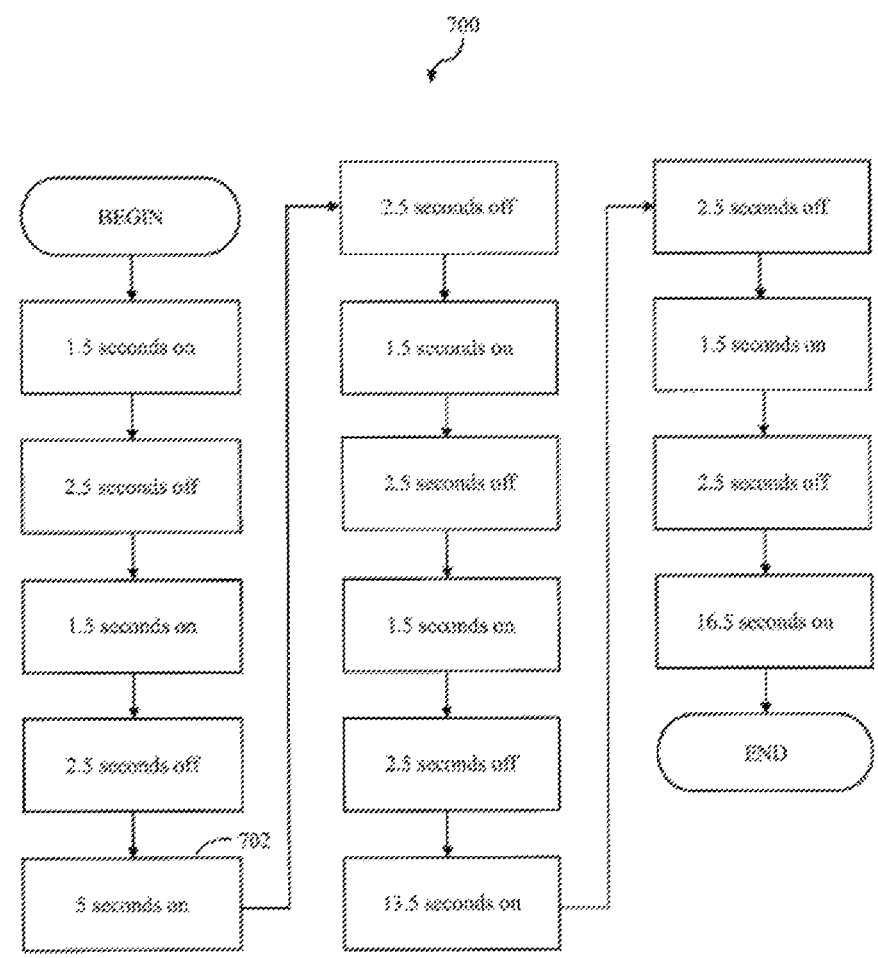
FIG. 7 is a flow chart of an illustrative food processing sequence in accordance with one aspect.

A sequence 600, as shown in FIG. 6, may be similar to sequence 500, but with a shorter final continuous run segment 602 of seven seconds instead of twelve seconds. A higher blade speed may permit the reduced continuous run time. In some embodiments, sequence 600 may be used with the personal serving container similar to the container shown in FIGS. 3 and 4, but with blender base 100. See, for example, FIG. 31.

Examples of foods where such sequences may be particularly beneficial include celery, cabbage, apples, ice, blueberries, and other fibrous foods and/or foods with skins.

For food combinations which are particularly difficult to blend and/or which contain ice, a sequence 700 with a higher number of pulse segments may be used. Sequence 700 includes a total of four pulses segments that have a 1.5 second "on" time period, and a 2.5 second "off" period. The additional pulse segments, as well as the increased "off" time periods relative to sequences 500 and 600, provide more chopping and initial liquefaction prior to continuous run segments that are longer than ten seconds. Also included in sequence 700 is a five second "on" segment 702 situated between two sets of pulse segments, which is intended to start crushing ice and/or fibrous components. As with sequences 500 and 600, the starts and stops help to prevent cavitation, while the continuous runs later in the sequence provide the blending which leads to a smooth consistency of the resulting product.

In some embodiments, the pulse segments include an "on" pulse of two seconds or less, while other embodiments include pulses of 2.5 seconds or less, or three seconds or less. In some embodiments, the pulse segments include an "on" pulse of at least 1 second, other embodiments include "on" pulses of at least 1.5 seconds, and further embodiments include "on" pulses of at least two seconds.

In some embodiments of blend sequences similar to sequence 700, the total amount of all "on" time periods may be at least thirty seconds, at least thirty-seven seconds, at least 42.5 seconds, or any other suitable length. The total time period of the entire sequence may be no more than fifty seconds in some embodiments, no more than fifty-five seconds in some embodiments, no more than sixty seconds in some embodiments, no more than sixty-five seconds in some embodiments, or may be limited to any other suitable time period.

Figure 8:
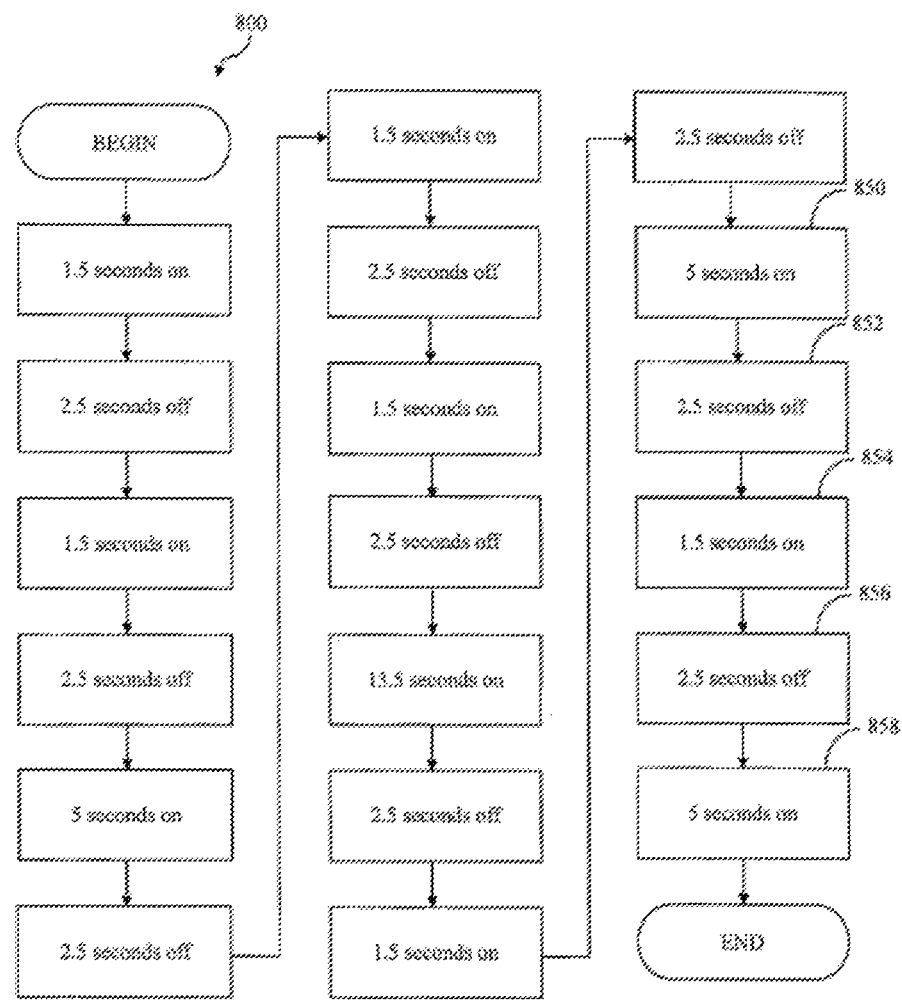
FIG. 8 is a flow chart of an illustrative food processing sequence in accordance with one

A sequence 800, as shown in FIG. 8 may be similar to sequence 700, but instead of a final continuous run segment of 16.5 seconds, sequence 800 includes a five second continuous run segment 850, a 2.5 second "off" segment 852, an "on" pulse 854 of 1.5 seconds, an "off" segment 856 of 2.5 seconds, and a final, continuous run segment 858 of five seconds. The extra two pauses in sequence 800 as compared to sequence 700 may provide two additional fountain effect sequence to recapture food caught outside of the blended mixture. The slight decrease in the total amount of time of "on" segments may be made possible by running the blades at a higher speed as compared to some embodiments of sequence 700. In some embodiments, sequence 800 may be used with the personal serving container similar to the container shown in FIGS. 3 and 4, but with blender base 100. See, for example, FIG. 33.

Figure 9:
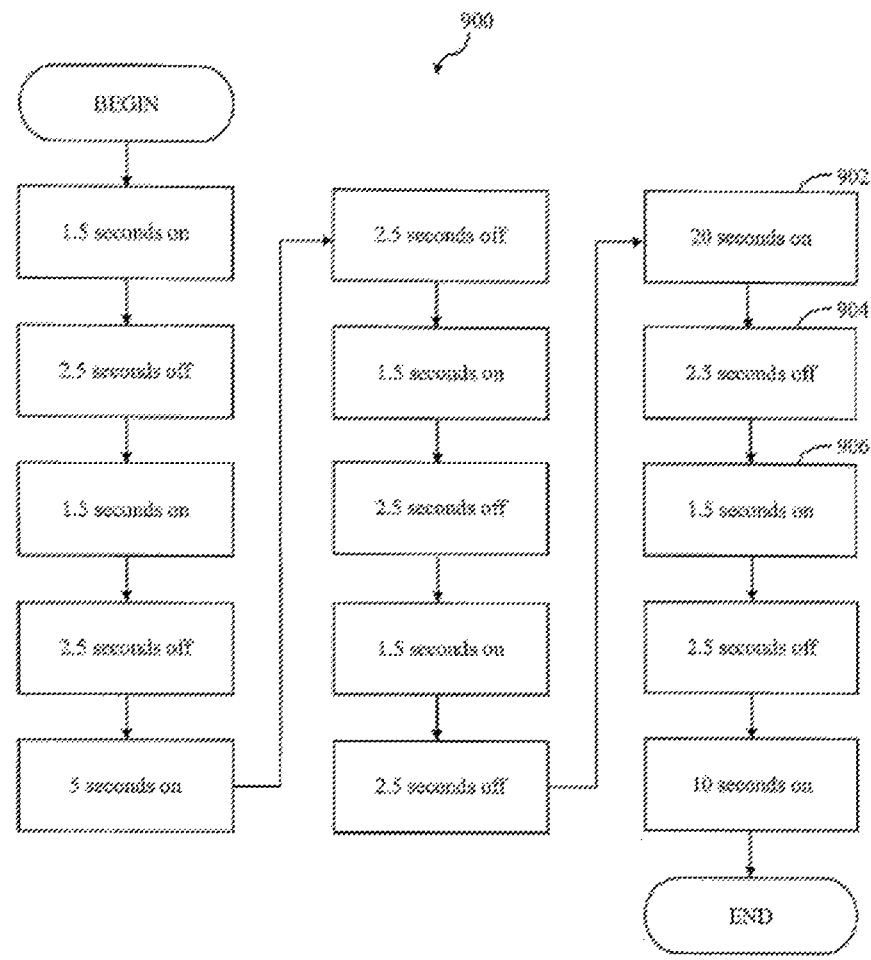
FIG. 9 is a flow chart of an illustrative food processing sequence in accordance with one aspect.

A flowchart 900 in FIG. 9 of a blending sequence includes acts which cause ingredients to surge briefly upwardly along an inner side wall of the blender container toward the upper end of the blender container to recapture ingredients that may be caught on the inner wall of the container or the underside of the container lid. For purposes herein, such action is referred to as a fountain effect sequence.

As one example of a fountain effect sequence, after a series of pulses where the motor is on for an amount of time, and then off (or otherwise paused) for 2.5 seconds, a sustained processing segment 902 runs for twenty seconds. During segment 902, the rotating processing tool may cause liquid in the container to form an inverted substantially conical shape on its surface due to the rotation of the liquid within the container. That is, the liquid may be slightly higher along the outer edge of the container as compared to the inner portions.

By stopping (or significantly slowing) the rotation of the processing tool in an act 904, the liquid may settle such that the inverted cone disappears or decreases, and some or all of the solid foods within the liquid mixture may fall toward the bottom of the container. After the liquid has been allowed to calm for a suitable amount of time, for example, 2.5 seconds in some embodiments, the processing tool is accelerated quickly to rapidly jettison liquid outwardly toward the walls of the containers as part of an act 906. The surge of liquid pushes up the inner walls of the container to reach upper areas that were not being contacted during the sustained processing of act 902. In this manner, food caught in the upper reaches of the container can be returned to the liquid mixture for proper processing. For example, food caught on the upper side wall, and in some cases the underside of the container lid, may be gathered with this stored sequence.

In the illustrated embodiment, act 906 includes a rapid acceleration, and the motor remains on for a total of 2.5 seconds. In other embodiments, the processing tool may be rapidly accelerated and remain on for only 1.5 seconds, or any other suitable length of time. Or, in some embodiments, the processing tool may be accelerated over a period of approximately three-quarters of a second, and the motor held on for a total of at least four seconds or a significantly longer amount of time.

The rapid acceleration of the processing tool may be approximately at least 2,500 rpm per second within a 72 oz. container holding 64 oz. of liquefied food in some embodiments, and the top speed may be reached within approximately 0.75 seconds of starting the motor. With a 5:1 ratio transmission present, the motor may accelerate at 12,500 rpm per second for the same container to accelerate the processing tool at 2,500 rpm per second. In some embodiments, the speed attained after the rapid acceleration is approximately equal to the speed prior to the slowdown or stop, while in other embodiments, the speed attained after the rapid acceleration may be different from the speed prior to the slowdown or stop.

Other acts of starting the motor within the same sequence may include a "soft start" where the motor is not allowed to accelerate as quickly as it is capable of doing, while the act of rapidly accelerating the processing tool may not include a restriction on the acceleration. In some embodiments, the food processing apparatus may be configured such that the food processing tool achieves an acceleration of at least approximately 3,400 rpm per second with a 72 oz. container holding 64 oz. of liquefied food. In other embodiments the food processing apparatus may be configured to achieve an acceleration of at least approximately 2,000 rpm per second with a 72 oz. container holding 64 oz. of liquefied food. In some embodiments, other acts of starting the motor within the same sequence and/or within other sequences may not include a "soft start".

The sequence that sends liquid up the side wall can be preceded and/or followed by continuous processing acts (e.g., 10 seconds or more, 13 seconds or more, or 20 seconds or more) in some embodiments so that desirable pulverization of the food items is achieved. Additionally, by including a relatively long, continuous processing act prior to a step of propelling liquid up the side wall of the container, there is a high likelihood that the processed ingredients will have been sufficiently liquefied to allow the liquid surge to work.

Though the amount of time required to liquefy the food ingredients can be dependent on the type and quantity of food being processed. In some embodiments, a sensor may be used to verify that sufficient liquefaction has been achieved prior to starting a sequence configured to propel liquid up the side wall. In some embodiments, no verification or sensing of the liquid properties of the food ingredients is provided.

During a fountain effect sequence, instead of completely stopping the motor and processing tool, the motor may be significantly slowed. For example, in some embodiments, the motor may be slowed to 10% or less of its prior speed to permit solid contents to settle and/or allow the liquid flow within the container to slow. Or the processing tool may be slowed to approximately 100 rpm or less to allow settling of contents.

Figure 10:
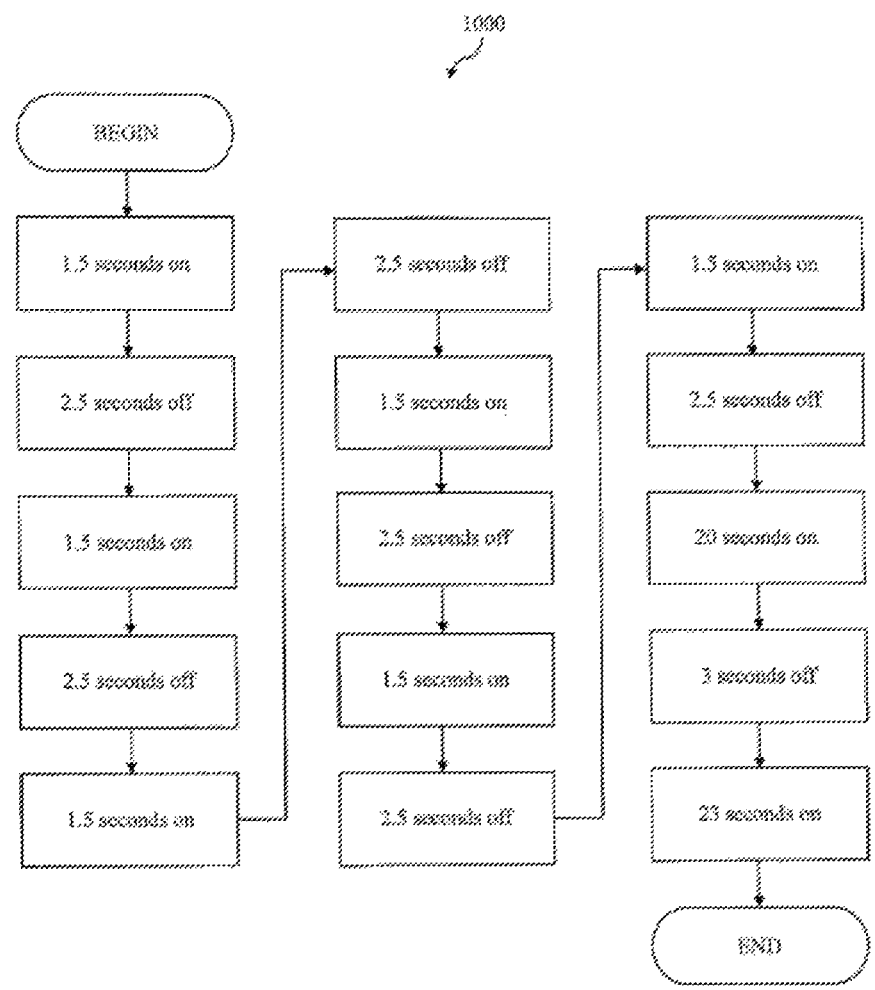
FIG. 10 is a flow chart of an illustrative food processing sequence in accordance with one aspect.

According to another aspect, a sequence shown in flow chart 1000 of FIG. 10 is particularly suited to process frozen food items. The sequence includes a series of six pulses where the motor runs for 1.5 seconds and then stops for 2.5 seconds. A twenty second continuous run is followed by a three second pause, and then a 23 second continuous run. The time period where the motor is off for three seconds and then followed by the 23 second run may be a fountain effect sequence in some embodiments by having the motor accelerate quickly at the beginning of the 23 second run. In other embodiments, the overall sequence may not include a fountain effect, and instead may have a slow start to the 23 second run. This frozen item blending sequence may be particularly effective when used in combination with the blade assembly shown in FIGS. 29 and 30. By incorporating a stopped portion between two extended run periods, larger pieces of food can fall back toward the bottom of the container and/or move toward the middle of the container, allowing the larger pieces to be chopped or otherwise processed by the blades or other processing tool.

Figure 11A:
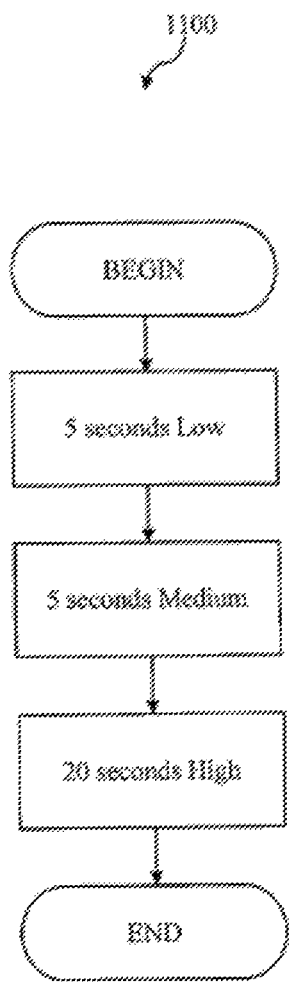
FIG. 11A is a flow chart of an illustrative food processing sequence in accordance with one aspect.

According to another aspect of the disclosure, a specific sequence of blending operations may be instituted to puree foods. For example, in some embodiments, a progression of faster speeds may be used to create a puree. A first and second speed may progress from low to medium to start processing the food, such as chickpeas. A third, high speed segment is run after the low and medium segments. By starting at slower speeds, the blades initially break down the ingredients so that during the higher speed phase, cavitation can be avoided. The higher speed purees the ingredients quickly but starting immediately at high speed could result in cavitation. In some embodiments, the high speed may be run for longer than the low and medium speed times combined, such as shown in the embodiment of FIG. 11A with a flow chart 1100. In some cases, the sequence may be arranged so that a given steady-state speed is not slower than any preceding steady-state speed. A puree sequence such as the one shown in FIG. 11A may be particularly useful in combination with the blade arrangement shown and described with reference to FIG. 3. In some embodiments, a puree sequence may include no stopping of the motor during the sequence.

Figure 11B:
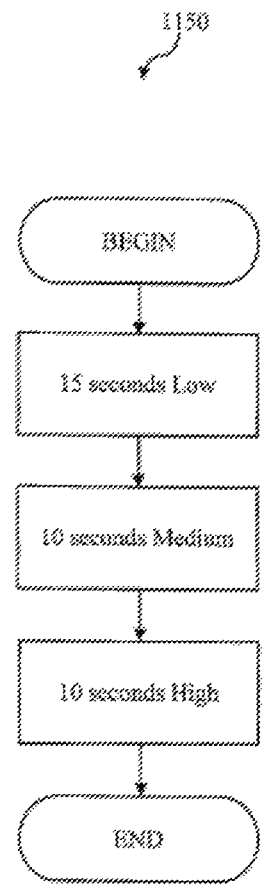
FIG. 11B is a flow chart of an illustrative food processing sequence in accordance with one aspect.

As shown in FIG. 11B with a flow chart 1150, the apparatus may be operated at a low speed for a longer period of time than a high speed. For example, in the embodiment of FIG. 11B, the blades are rotated at a first, low speed for fifteen seconds, then at a medium speed for ten seconds, and finally at a high speed for ten seconds. Such an arrangement may be helpful when the high speed segment is run at 1,300 watts or below, in order to sufficiently process the ingredients during the low and medium segments to permit a desirable flow of ingredients during the high speed segment. A puree sequence such as the one shown in FIG. 11B may be particularly useful in combination with the blade arrangement shown and described with reference to FIG. 3. In some embodiments, the total time period of a low speed segment and a medium speed segment combined may exceed the time period of a high speed segment. The low speed may be run with a motor power that would provide 15,000 rpm unloaded—900 watts in some embodiments, or at another suitable power. The medium speed may be run with a motor power that would provide 20,000 rpm unloaded—1,200 watts in some embodiments, or at another suitable power. And the high speed may be run with a motor power that would provide 21,500 rpm unloaded—1,275 watts in some embodiments, or at another suitable power.

Figure 12:
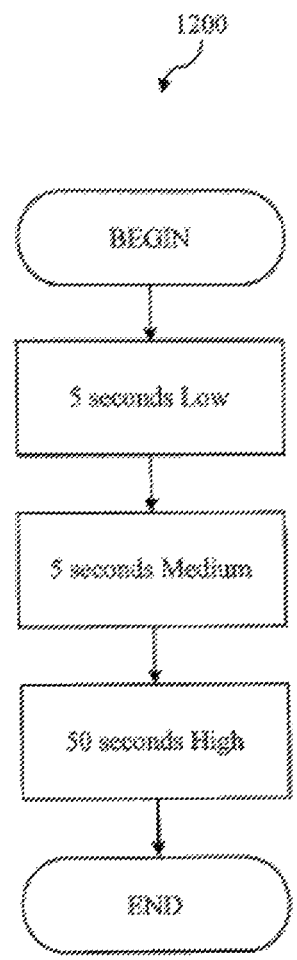
FIG. 12 is a flow chart of an illustrative food processing sequence in accordance with one aspect.

FIG. 12 shows a flow chart 1200 of a sequence for pureeing food, where a third, high speed is run for longer than a first, low speed and a second, medium speed combined. In this particular embodiment, the low and medium speeds are operated for five seconds each, and the high speed is operated for fifty seconds. One or more of the low, medium, and high speed segments may be run for longer than five seconds, five seconds, and fifty seconds respectively in some embodiments. In some embodiments, the low speed is run for at least four seconds, the medium speed is run for at least four seconds, and the high speed is run for at least forty seconds.

A puree sequence such as the one shown in FIG. 12 may be particularly useful in combination with the stacked blade arrangements shown and described with reference to FIGS. 29 and 30 further below.

Figure 13:
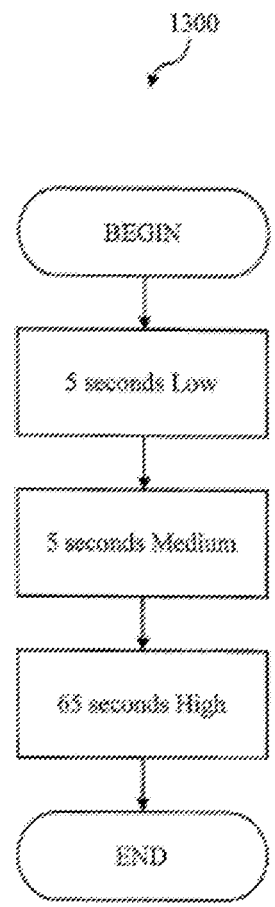
FIG. 13 is a flow chart of an illustrative food processing sequence in accordance with one aspect.

FIG. 13 shows a flow chart 1300 of a sequence for pureeing food, where again, a third, high speed is run for longer than a first, low speed and a second, medium speed combined. In this particular embodiment, the low and medium speeds are operated for five seconds each, and the high speed is operated for sixty-five seconds. One or more of the low, medium, and high speed segments may be run for longer than five seconds, five seconds, and sixty-five seconds respectively in some embodiments. In some embodiments, the low speed is run for at least four seconds, the medium speed is run for at least four seconds, and the high speed is run for at least fifty-five seconds.

A puree sequence such as the one shown in FIG. 13 may be particularly useful in combination with the stacked blade arrangements shown and described with reference to FIG. 32 further below.

Figure 14:
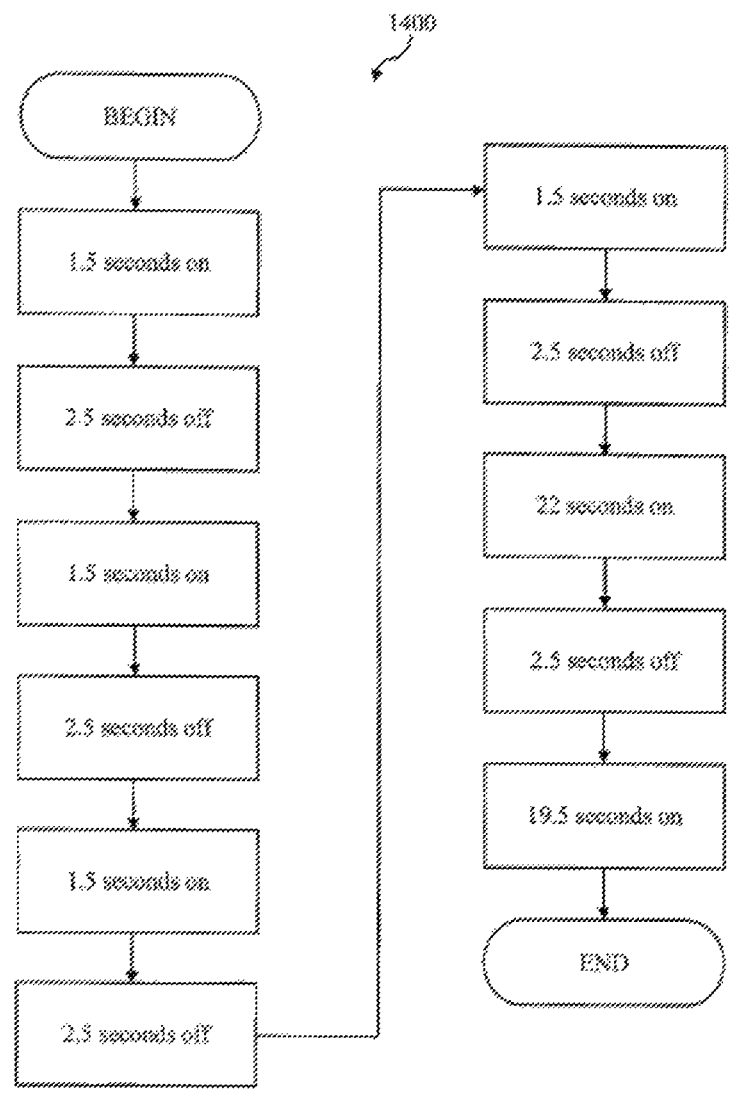
FIG. 14 is a flow chart of an illustrative food processing sequence in accordance with one aspect.

A sequence configured for use with the blades and container shown in FIG. 3 is shown with a flow chart 1400 in FIG. 14. This sequence may be used to process frozen foods to produce a personal serving. A series of four pulses start the sequence, each being 1.5 seconds on and 2.5 seconds off. An act of powering the processing tool for twenty-two seconds follows the pulses. The motor is then turned off for 2.5 seconds, and then rapidly accelerated to provide a fountain effect. Once the motor is brought up to speed by the rapid acceleration, the motor is maintained on for a total of 19.5 seconds. The motor may be powered for other periods of time, for example, at least eight seconds in some embodiments.

In some embodiments, the overall sequence may not include a fountain effect sequence, and instead may have slow start to the 19.5 second run. The sequences associated with frozen food, such as the sequence shown in FIG. 14, may be used with processing assemblies and containers other than those shown in FIG. 3. The sequence of FIG. 3 (and variants thereof) may be used with the blender base shown in FIG. 2, or, in some embodiments, may be used with the blender base shown in FIG. 1. For example, see FIG. 33 which shows a container similar to that of FIG. 3 being used with the blender base of FIG. 1.

Figure 15:
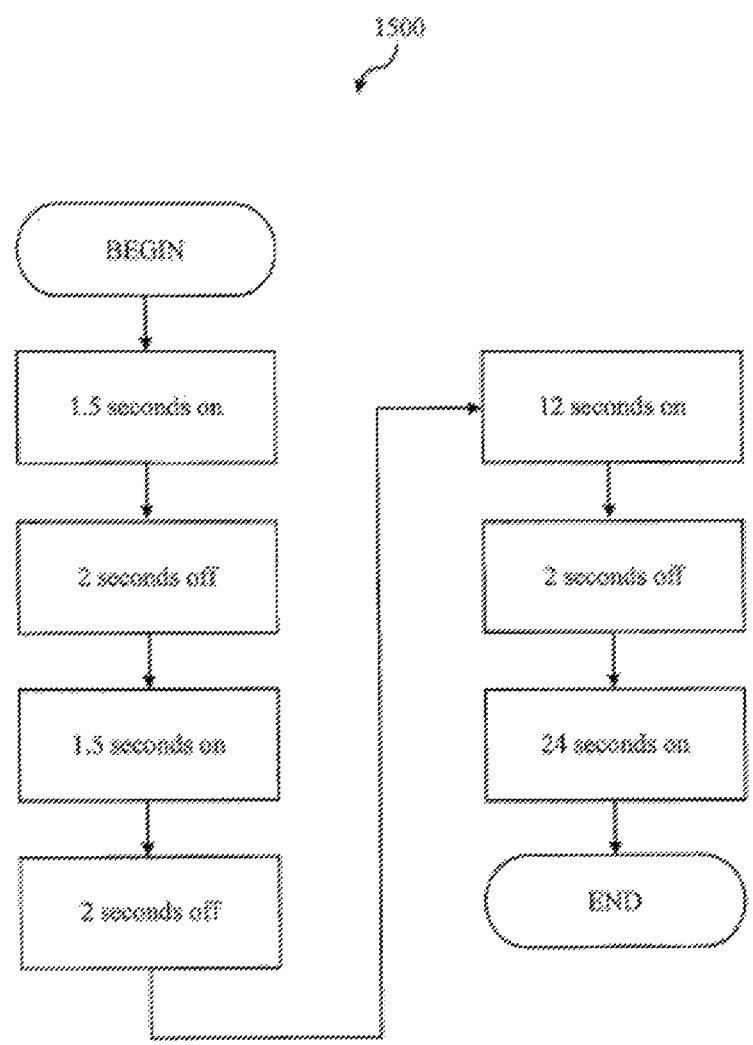
FIG. 15 is a flow chart of an illustrative food processing sequence in accordance with one aspect.

The blades and container shown in FIG. 3 may be used with the sequence shown in flow chart 1500 in FIG. 15 to process fresh foods. The sequence includes two pulses of 1.5 seconds on and two seconds off, followed by a twelve second on period. A fountain effect sequence is then employed, with two seconds off, followed by a rapid acceleration. In some embodiments, the act of running the motor for twenty-four seconds after the two second pause may not include a rapid acceleration and may instead include an acceleration where the power to the motor is restricted.

The illustrated sequence may be used with containers and/or processing tools other than the container and processing tool shown in FIG. 3 in some embodiments.

Figure 16:
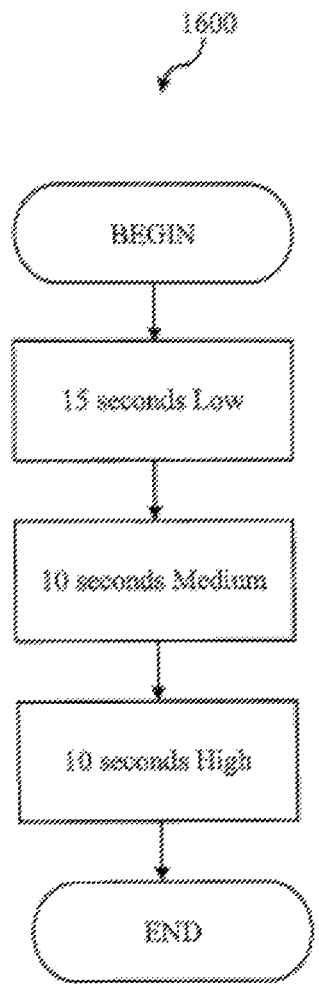
FIG. 16 is a flow chart of an illustrative food processing sequence in accordance with one aspect.

FIG. 16 shows a flow chart 1600 for one embodiment of a sequence that is particularly suited for personal serving containers (e.g., see FIG. 3) when pureeing food items. The sequence includes fifteen seconds at a low setting, ten seconds at a medium setting, and ten seconds at a high setting. The low setting may be run at a power which runs the motor at approximately 15,000 rpm when unloaded (though more slowly when loaded). The medium setting may be run at a power which runs the motor at approximately 20,000 rpm when unloaded, and the high setting may be run at a power which runs the motor at approximately 21,500 rpm when unloaded.

Figure 17:
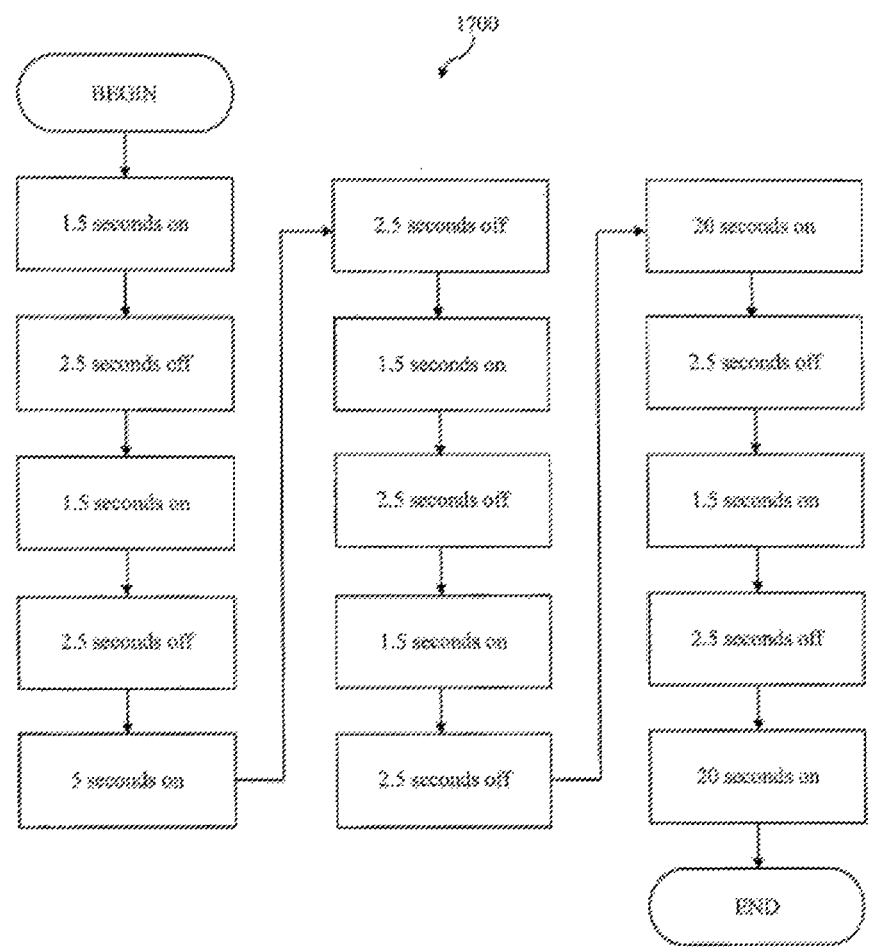
FIG. 17 is a flow chart of an illustrative food processing sequence in accordance with one aspect.

A seventy second sequence is illustrated in flowchart 1700 in FIG. 17 as one embodiment which is particularly suited to crush ice as part of processing ingredients in personal serving container, such as the container shown in FIG. 3. This sequence includes two pulses followed by five seconds on and 2.5 seconds off. Two more pulses are executed, followed by twenty seconds on, 2.5 seconds on, and then another pulse. The sequence concludes with twenty seconds of continuous run time. Each of the segments may be run at 85% power in some embodiments.

Figure 18:
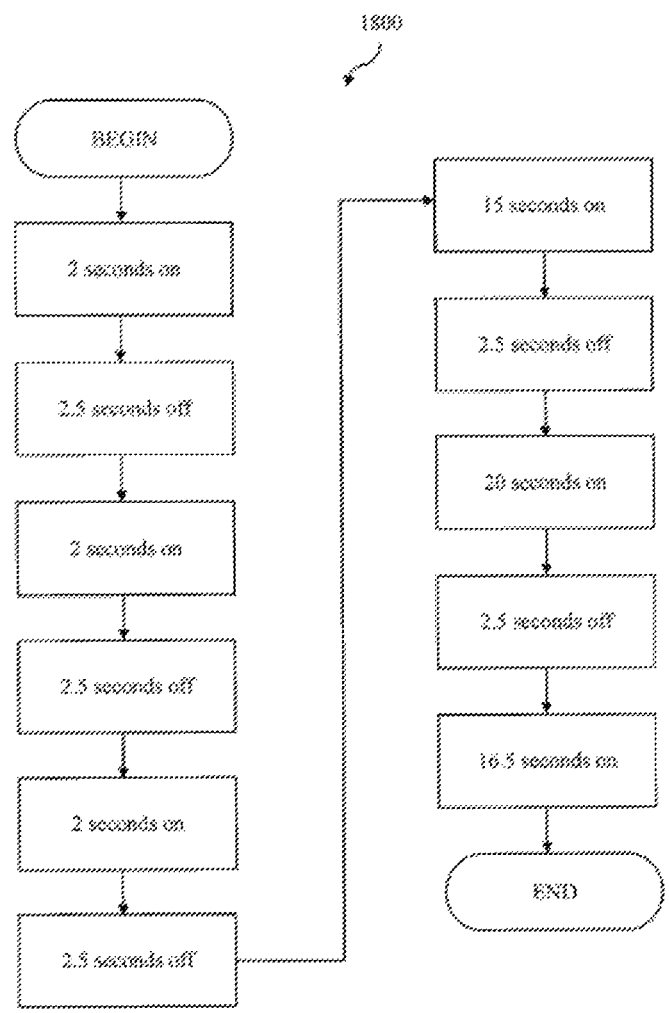
FIG. 18 is a flow chart of an illustrative food processing sequence in accordance with one aspect.
Figure 19:
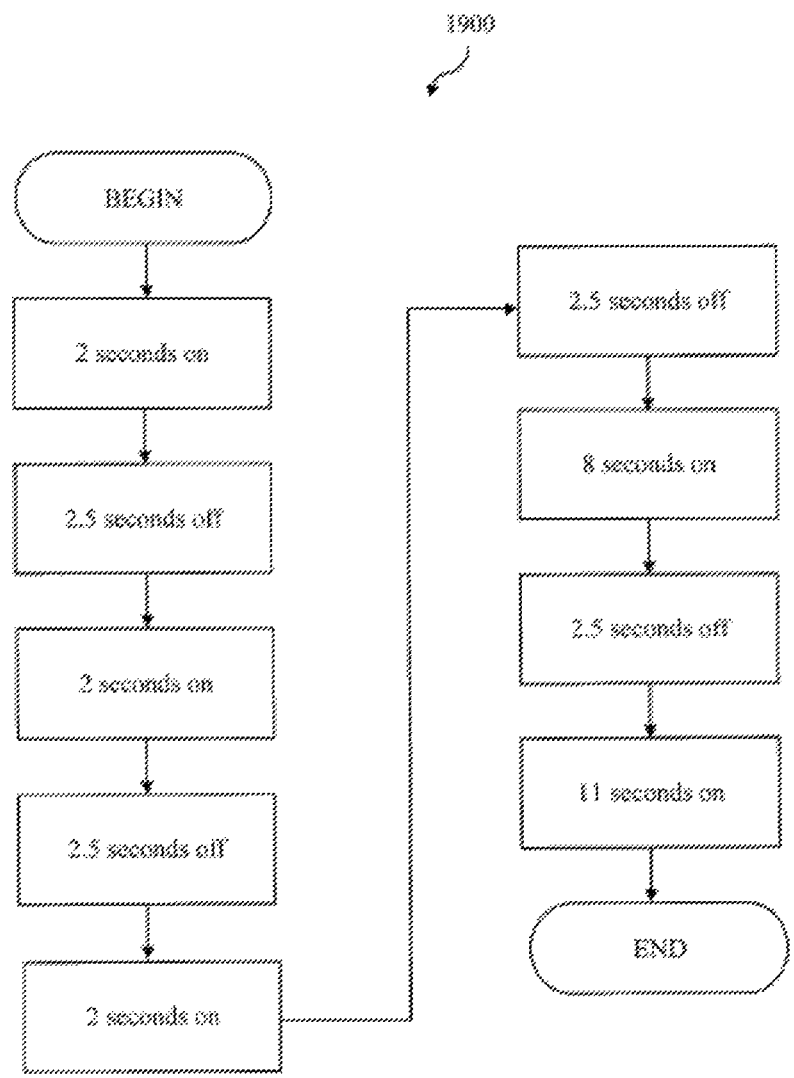
FIG. 19 is a flow chart of an illustrative food processing sequence in accordance with one aspect.
Figure 31:
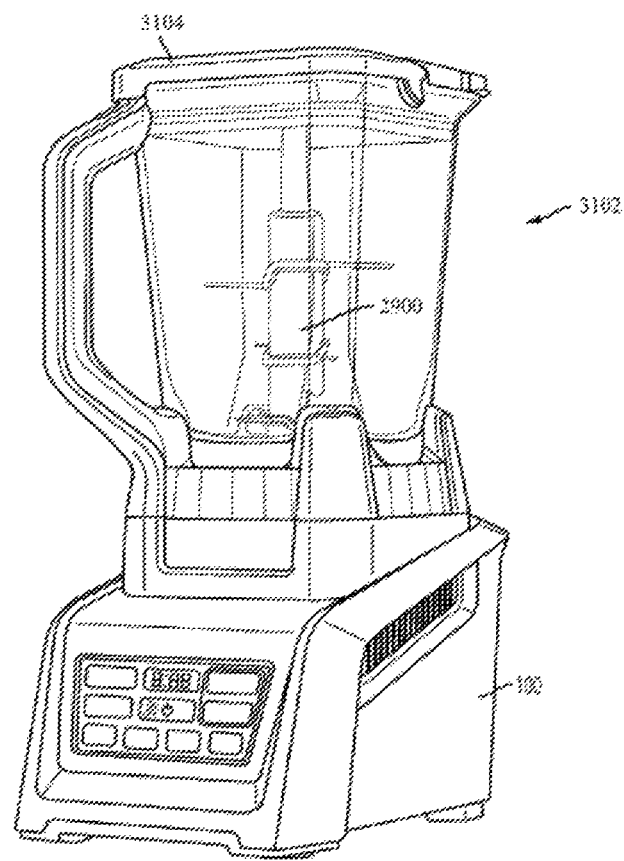
FIG. 31 is a perspective view of container attached to a blender base in accordance with one aspect.

FIGS. 18 and 19 illustrate sequences 1800 and 1900, respectively, that may be used for blending and, in some embodiments, blending in a container such as the container shown in FIG. 31. The seventy-second sequence shown in flowchart 1800 begins with a series of three pulses, each being 2 seconds on and 2.5 seconds off. Following the pulses, the motor is rapidly accelerated and maintained on for 15 seconds. The motor is then turned off for 2.5 seconds, and then brought up to speed by rapid acceleration and maintained on for a total of 20 seconds. The motor is again turned off for 2.5 seconds, and then brought up to speed by rapid acceleration and maintained on for a total of 16.5 seconds. In some embodiments, the total time of all blending segments is at least 51.5 seconds. In some embodiments, the total time of all blending segments is less than 52 seconds. The total time of all pauses may be at least 12.5 seconds.

Figure 20:
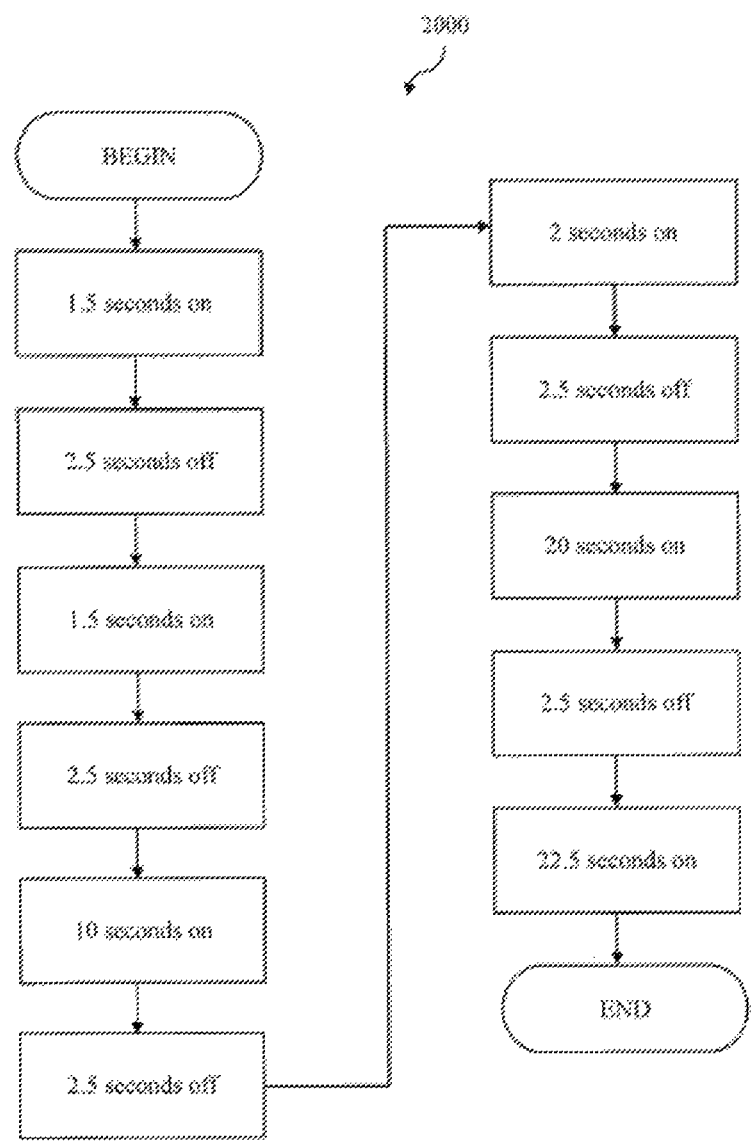
FIG. 20 is a flow chart of an illustrative food processing sequence in accordance with one aspect.
Figure 21:
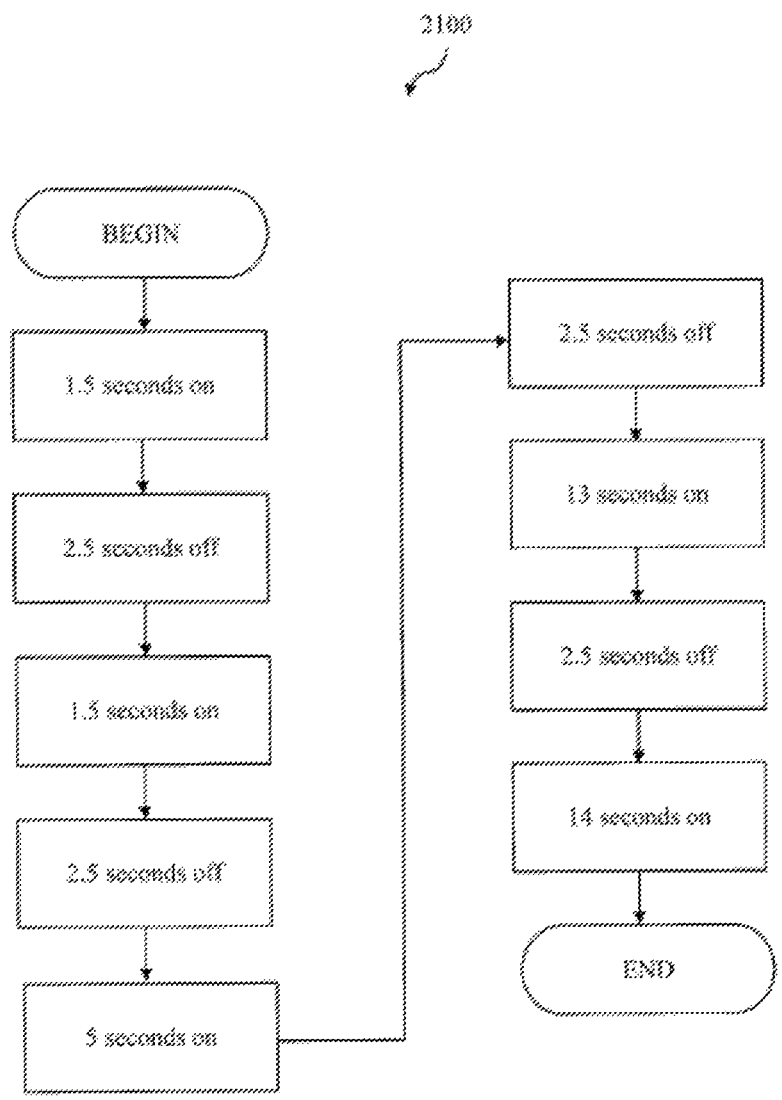
FIG. 21 is a flow chart of an illustrative food processing sequence in accordance with one aspect.

The thirty-five-second sequence illustrated in flowchart 1900 also begins with a series of three pulses, each being 2 seconds on and 2.5 seconds off. Following the pulses, the motor is rapidly accelerated and maintained on for 8 seconds. The motor is then turned off for 2.5 seconds, and then brought up to speed by rapid acceleration and maintained on for a total of 11 seconds. In such embodiments, the total time of all blending segments is at least 19 seconds, and the total time of all pauses is at least 10 seconds. FIGS. 20 and 21 show sequences 2000 and 2100, respectively, that may be used for extracting (e.g., extracting nutrients) and, in some embodiments, extracting using a personal serving container (see, e.g., FIG. 3). The seventy-second sequence illustrated in flowchart 2000 begins with a series of two pulses, each being 1.5 seconds on and 2.5 seconds off. Following the pulses, the motor is rapidly accelerated and maintained on for a total of 10 seconds, and then is turned off for 2.5 seconds. A pulse of 2 seconds on and 2.5 seconds off follows. The motor is again rapidly accelerated and maintained on for a total of 20 seconds. The motor is turned off for 2.5 seconds and then brought up to speed by rapid acceleration and maintained on for a total of 22.5 seconds. In some embodiments, the total time of all blending segments is at least 52 seconds and, in some embodiments, at least 52.5 seconds. The total time of all pulses may be at least 12.5 second.

The forty-five-second sequence illustrated in flowchart 2100 also begins with a series of two pulses, each 1.5 seconds on and 2.5 seconds off. The motor is then turned on for 5 seconds and then turned off for 2.5 seconds. Next, the motor is brought up to speed rapidly and maintained on for 13 seconds. The motor is then turned off for 2.5 seconds and rapidly accelerated and maintained on for 14 seconds. In such an embodiment, the total time of all blending segments is at least 32 seconds, and the total time of all pulses is at least 10 seconds.

Figure 22:
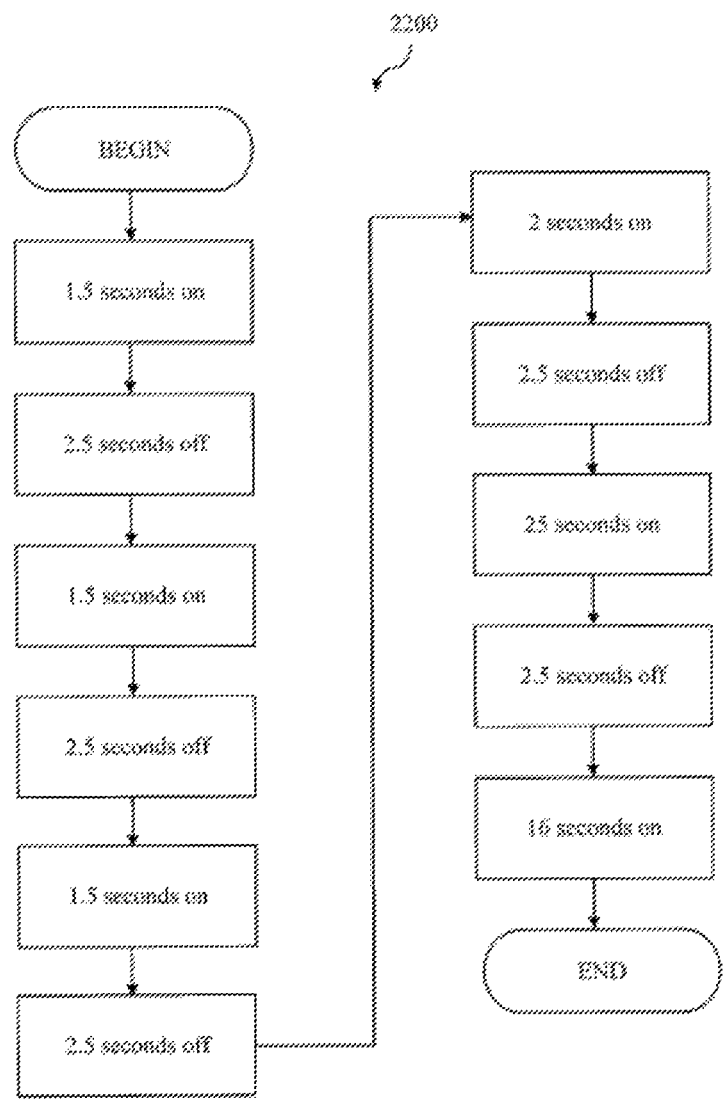
FIG. 22 is a flow chart of an illustrative food processing sequence in accordance with one aspect.
Figure 23:
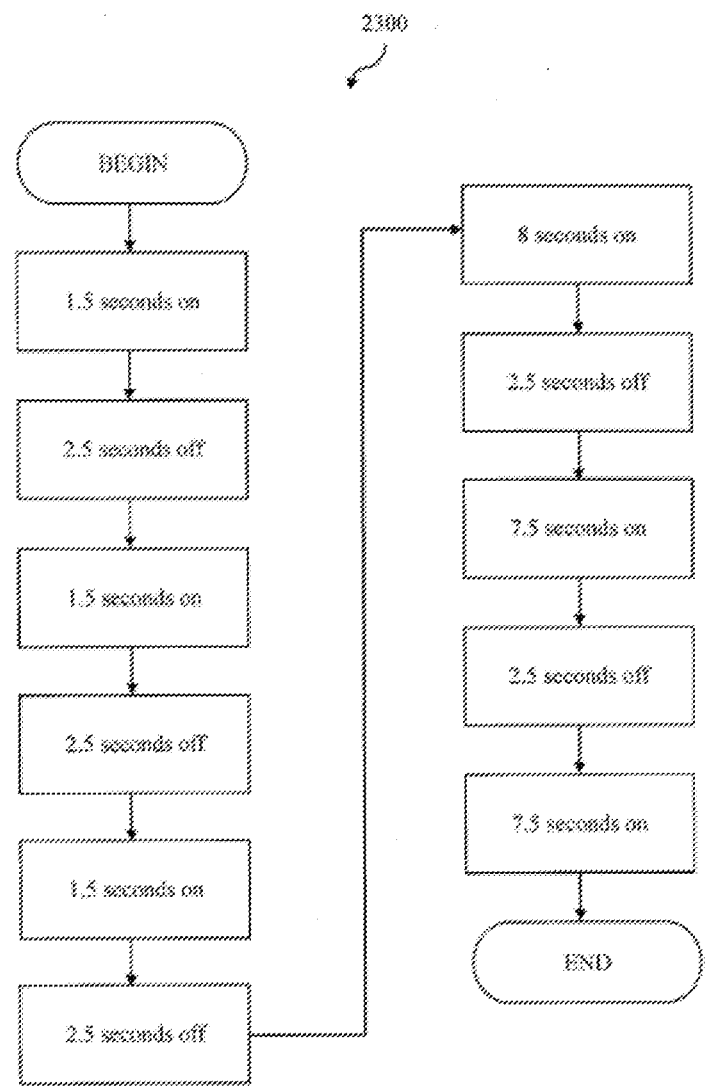
FIG. 23 is a flow chart of an illustrative food processing sequence in accordance with one aspect.

FIGS. 22 and 23 show sequences 2200 and 2300, respectively, for blending and, in some embodiments, blending in a personal serving container (see, e.g., FIG. 3). The sixty-second sequence illustrated in flowchart 22 begins with three pulses, each being 1.5 seconds on and 2.5 seconds off. A fourth pulse, being 2 seconds on and 2.5 second off, follows. The motor is then rapidly accelerated and maintained on for a total of 25 seconds. The motor is then turned off for 2.5 seconds and then brought up to speed by rapid acceleration and maintained on for 16 seconds. In this embodiment, the total time of all blending segments is at least 41 seconds, and the total time of all pulses is at least 12.5 seconds.

The forty-second sequence of flowchart 2300 also beings with three pulses, each being 1.5 seconds on and 2.5 seconds off. The motor is then rapidly accelerated and maintained on for 8 seconds. The motor is then turned off for 2.5 seconds, and then rapidly accelerated and maintained on for 7.5 seconds. The motor is again turned off for 2.5 seconds, and then brought up to speed by rapid acceleration and maintained on for 7.5 second. In such an embodiment, the total time of all blending segments is at least 23 seconds, and the total time of all pulses is at least 12.5 seconds.

Figure 24:
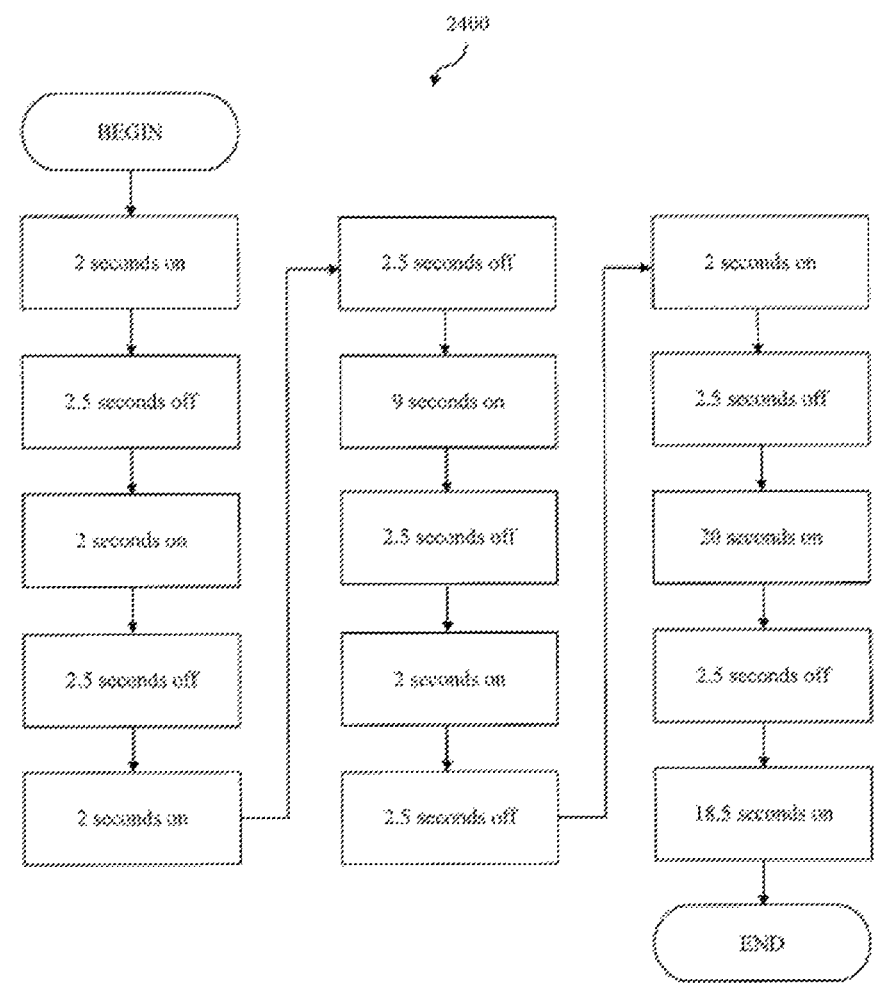
FIG. 24 is a flow chart of an illustrative food processing sequence in accordance with FIG. 25 is a flow chart of an illustrative food processing sequence in accordance with one aspect.
Figure 25:
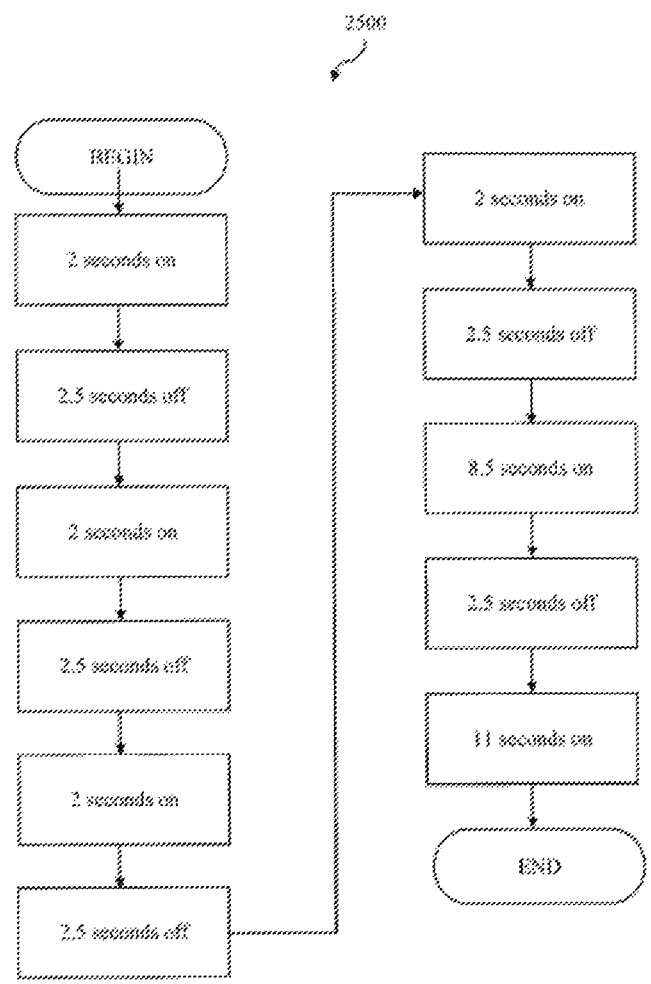

FIGS. 24 and 25 show sequences 2400 and 2500, respectively, for blending (e.g., blending in the container shown in FIG. 31). The seventy-five-second sequence illustrated in flowchart 2400 begins with three pulses, each being 2 seconds on and 2.5 seconds off. Following the pulses, the motor is rapidly accelerated and maintained on for 9 seconds and is then turned off for 2.5 seconds. Two more pulses, each being 2 seconds on and 2.5 seconds off, follow. The motor is then rapidly accelerated and maintained on for 20 seconds. The motor is then turned off for 2.5 seconds, and then brought to speed rapidly and maintained on for 18.5 seconds. In some embodiments, the total time of blending segments is at least 47 segments, and in some embodiments at least 47.5 seconds. The total time of all pulses may be at least 17.5 seconds.

The forty-second sequence of flowchart 2500 begins with four pulses that are each 2 seconds on and 2.5 seconds off. Following the pulses, the motor is bought up to speed rapidly and maintained on for 8.5 seconds. The motor is then turned off for 2.5 seconds and then rapidly accelerated and maintained on for 11 seconds. In such an embodiment, the total time of all blending segments is at least 19.5 seconds, and the total time of all pulses is least 12.5 seconds.

Figure 26:
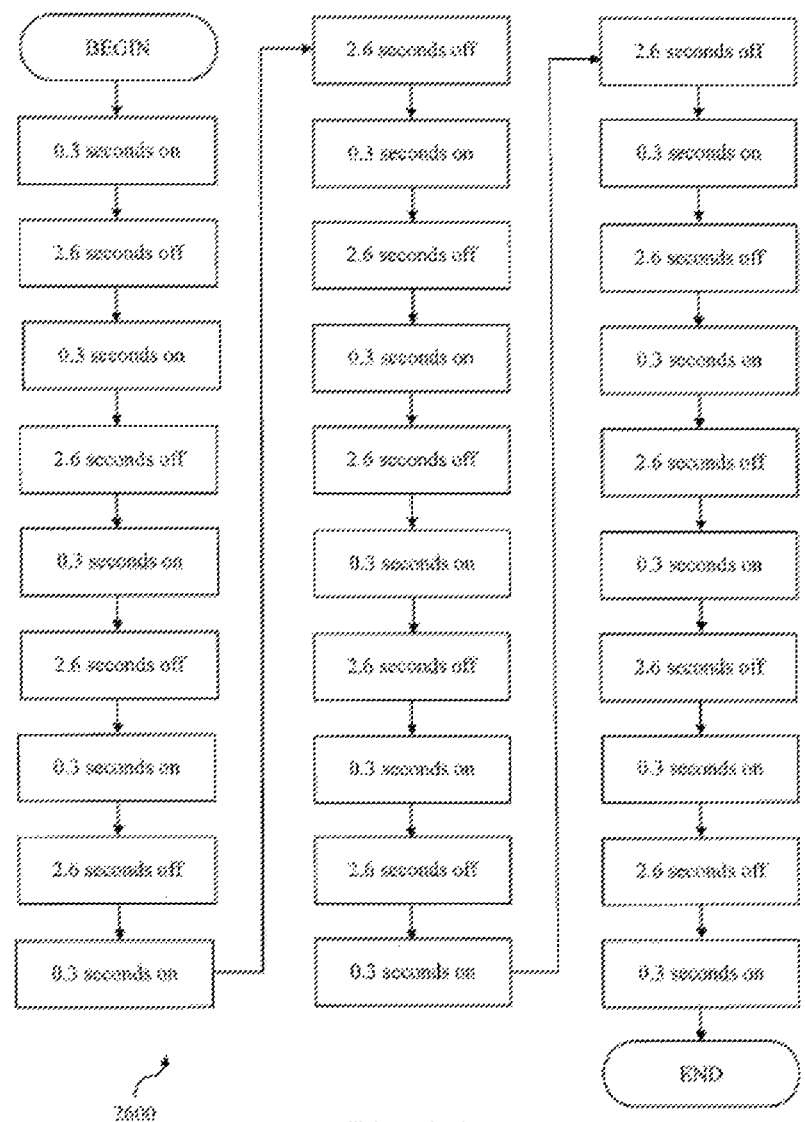
FIG. 26 is a flow chart of an illustrative food processing sequence in accordance with one

FIG. 26 illustrates sequence 2600, which may be used for chopping (e.g., chopping with the container shown in FIG. 31). This 40.9-second sequence includes fourteen pulses, each pulse being 0.3 seconds on and 2.6 seconds off. The motor is pulsed for a fifteenth time for 0.3 seconds on. In this embodiment, the total time of all blending segments is at least 19.5 seconds, and the total time of all pulses is least 12.5 seconds.

In the embodiments shown in FIGS. 18-26, the motor may operate with a 200 ms linear ramp from zero to full power during transitions from off to on, excepts during the pulses. In the embodiments illustrated in FIGS. 18-19 and 24-26, the motor may operate a high setting of approximately 4,000 rmp. The motor also may have a low setting of approximately 2,800 rpm. In the embodiments illustrated in FIGS. 20-23, the motor may operate at a high setting of approximately 20,000 rpm. The motor also may have a low setting of approximately 12,000 rpm.

In the embodiments described, the time provided for the pulsing segments and blending segments may differ from those described. For example, the times may vary up to about 0.5 seconds for each of the stated ranges.

User-Alterable Program

Figure 27:
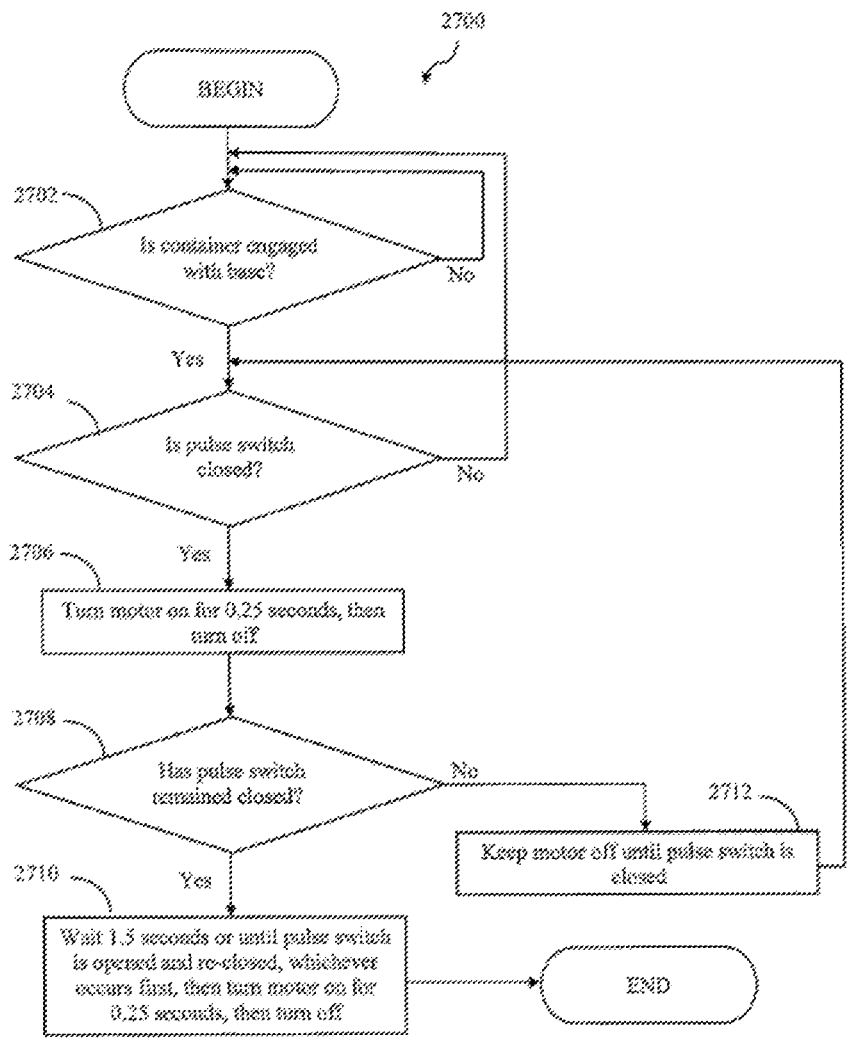
FIG. 27 is a flow chart of an illustrative food processing algorithm in accordance with one

A flowchart 2700 of a pulse control algorithm is shown in FIG. 27 as one example of a food processing sequence which can be altered by a user during operation of the sequence. In an act 2702, the controller checks that a container is engaged with the blender base via a sensor. If engaged, the controller checks whether a pulse switch is closed (i.e., actuated) in an act 2704. The pulse switch may be closed by a user pressing a button in some embodiments, or in any other suitable manner. The term "switch", for purposes herein, is intended to be construed broadly, in the sense that any device or structure which receives a user input and is capable of communicating the resulting state of the device to the controller should be considered to be a switch.

Once the pulse switch is closed, the motor is turned on for 0.25 seconds in an act 2706 in the illustrated embodiment. The motor is then shut off regardless of any further action taken by the user with respect to the pulse button during the 0.25 seconds that the motor is running. After the 0.25 seconds of motor run time, if the pulse switch has been continuously closed (e.g., by the user continuously pressing the pulse button) throughout the 0.25 seconds, as checked in an act 2708, the motor remains off until one of two actions occurs. In a first scenario, if the pulse button continues to be pressed, that is, if the button is not released from the time of its initial pressing, the motor will re-start 1.5 seconds after the initial 0.25 run time is completed, and run for a second 0.25 second time period (act 2710). This stored 1.5 second interval represents a default "off" time. In a second scenario, if the pulse button is released at any time, and then re-pressed while the motor is off, a new 0.25 second motor run time is started at the time of the re-pressing of the button. In this manner, in an act 2712, the motor remains off until the pulse switch is closed.

In this manner, the user is able to control the "off" time during the pulsing routine, but the "on" time is not alterable by the user through use of the pulse button. In some embodiments, pressing an "off" or "stop" button can stop the motor during a pulsing routine prior to the programmed stop time.

If the pulse button is continuously held, the motor will cycle through the stored on and off time periods until a stored number of cycles is reached in some embodiments.

For example, in some embodiments, the motor will turn on thirty times, with pauses between the run times, before the controller stops the motor to run.

A counter display may be included on the food processing apparatus in some embodiments to indicate to the user how many cycles (i.e., how many motor activations) have occurred. Releasing the pulse button does not reset the counter in some embodiments. For example, if eight cycles have been run, and the user releases the pulse button to extend an off time, the number "8" will remain on the display and resume upward counting if the pulse button is again pressed. If, after the pulse button has been released, the user presses a different sequence button or other button prior to re-pressing the pulse button, the display will stop displaying the number of pulse cycles, and the next time the pulse button is pressed, the display counter will start at zero.

In some embodiments, the amount of time that the motor is on for each pulse may be different than 0.25 seconds. For example, in some embodiments, it may be 0.20 seconds, or 0.50 seconds, or any other suitable length of time. The default time may be different than 1.5 seconds. In some embodiments, the default time may be 1.0 seconds or 2.0 seconds, or any other suitable length of time.

The lengths of times (e.g., 0.25 seconds "on" and 1.5 seconds "off") may be based on values stored in a memory associated with the controller. For purposes herein, when a stored value is used twice—once in a first instance and once in a second instance, the stored value may be considered to be two values. For example, consider a configuration where a first time period is described as being based on a first stored value, a second time period is described as being based on a second stored value, and both time periods are the same length of time. Even if the exact same stored value is referenced by the controller to set the length of both time periods, for purposes herein, one may consider that two stored values exist.

In some embodiments, the user may alter the amount of time that a certain segment of an overall sequence lasts, and the user may make this alteration during the operation of the sequence, or even during the operation of the particular segment being altered. For example, the length of a high speed segment may be extended by the user by pressing a "continue" or "extend" button (or other suitable input) while the high speed segment is operating. This segment may be a portion of the sequence that is not at the end of the sequence in some embodiments.

Dual Coupler

Figure 28:
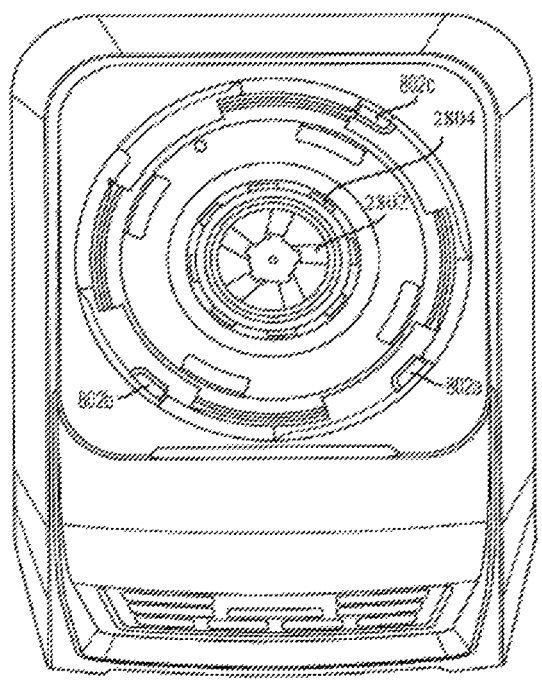
FIG. 28 is a top view of a blender base in accordance with one aspect.

FIG. 28 is a top view of base 100 for a food processing apparatus according to one embodiment of the present disclosure. The base 100 includes a body having a first, inner drive coupler 2802 and a second, outer drive coupler 2804. The drive couplers 2802, 2804 can be driven by the motor (not shown) within the base 100. A transmission system may be configured within the base 100 to rotate the first, inner drive coupler at a faster speed than the second, outer drive coupler 2804. A first container used with the blender base 100 may couple with only the first, inner drive coupler 2802. For example, a personal serving type of container as shown in FIG. 3 may couple with the inner driver coupler 2802. A second container, e.g., the container 3102 shown in FIG. 31 or the container 3202 shown in FIG. 32, may couple with only the second, outer drive coupler 2804. In this manner, processing tools can be driven at different speeds by a motor operating at a single speed.

The first row of Table 1 below shows the rotational speeds at which the motor would operate for the low, medium, high, and pulse settings in some embodiments. Rows 2-4 show the rotational speeds of the processing tools in the identified container (again assuming that no food is present in the container). The reduced speeds of the processing tool in the 72 oz. jar are a result of the outer drive coupler being geared down by a 5:1 ratio (see FIG. 28 and its associated description). The 7-up bowl container also couples with the outer drive coupler, and additionally includes a 3:1 gear down within the container itself, resulting in an overall 15:1 gear down relative to the motor speed.

TABLE 1

|  | Low | Medium | High | Pulse |
| --- | --- | --- | --- | --- |
| Motor | 15,000 rpm | 20,000 rpm | 24,000 rpm | 24,000 rpm |
| 72 oz. Container | 3,000 rpm | 4,000 rpm | 4,800 rpm | 4,800 rpm |
| 7-Cup Bowl | 1,000 rpm | 1,333 rpm | 1,600 rpm | 1,600 rpm |
| Bowl in Bowl | 1,000 rpm | 1,333 rpm | 1,600 rpm | 1,600 rpm |

Table 2 shows the rotational speed of the processing tool (e.g., blades) in the personal serving container. There is no gearing down of the motor speed to the blade speed in some embodiments, and therefore the motor speed is the same as the blade speed. The power supplied to the motor at the high setting may be 85% of rated power, thereby keeping the motor speed and blade speed to approximately 21,500 rpm.

TABLE 2

|  | Low | Medium | Hi2h | Pulse |
| --- | --- | --- | --- | --- |
| Personal Serving Container | 15,000 rpm | 20,000 rpm | 21,500 rpm | 21,500 rpm |

Container Sensors

Also visible on the blender base 100 illustrated in FIG. 28 are three depressible plungers 802a, 802b, and 802c, some or all of which may be used to sense the presence of a container on the blender base by being pressed by protrusions on the containers such that the plungers trip a switch. In some embodiments, the plungers, or other sensors, may be used to determine what type of container is mounted to the blender base.

For example, in one embodiment, one of plungers 802a and 802b is configured to be pressed by a protrusion on a 72 oz. container, such as the one shown in FIG. 31, when the container is attached to the blender base 100. Which of the two plungers 802a, 802b is pressed when the container is attached depends on the orientation of the container when it is attached. In either of the two available orientations, either plunger 802a or plunger 802b is pressed. A plunger 802c is not pressed when the 72 oz. container is attached to the blender base. In this embodiment, the controller may be configured to determine that the 72 oz. container is attached when either of plungers 802a or 802b is pressed but plunger 802c is not pressed.

Figure 32:
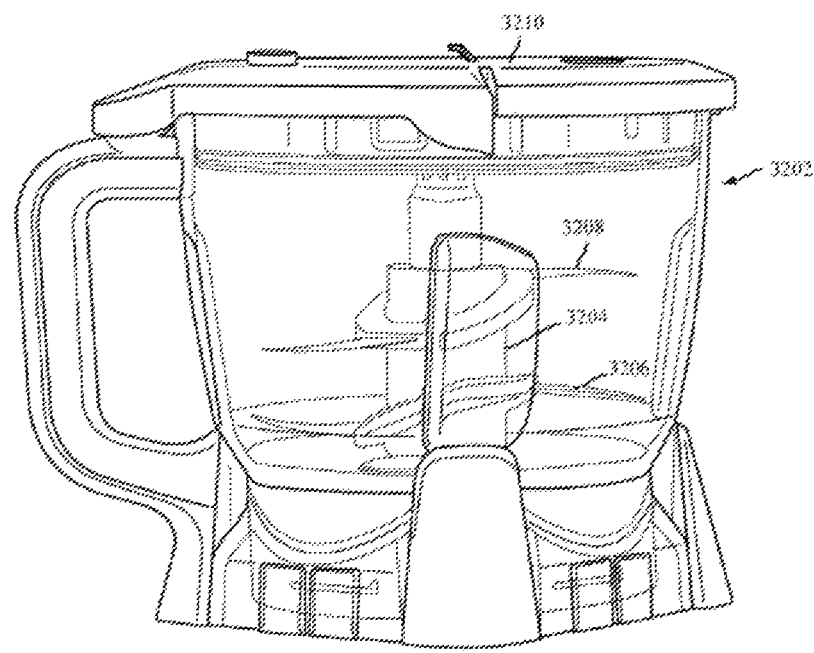
FIG. 32 is a side view of a container in accordance with one aspect.

When a food processing container, such as the one shown in FIG. 32, is mounted to blender base 100, plunger 802c is pressed. One or both of plungers 802a and 802b may additionally be pressed, but the controller may be arranged to determine that the food processing container is attached when plunger 802c is pressed.

To sense the presence of a personal serving container, a separate sensor, such as one or more depressible protrusions arranged to interact with tabs of the personal serving container may be used. When a switch associated with the depressible protrusion is triggered, the controller may determine that the personal serving container is attached.

Depending on which type of container is sensed to be present on the blender base, one or more of the buttons may not be available for used as a user input. For example, referring back to FIG. 1, button 118 may only be useable when the personal serving container is mounted to the blender base. When the personal serving container is mounted to the base, an indicator light 132 illuminates to let the user know that the sequence associated by button 118 is available for use with the mounted container. When a different type of container is mounted to blender base 100, indicator light 132 does not illuminate, thereby indicating to the user that that particular sequences is not available for use.

In some embodiments, the same button may be used to initiate different sequences depending on which type of container is attached. For example, pressing button 116 may cause a puree sequence to start. However, when a container of the type shown in FIG. 31 is present, the puree sequence initiated by pressing button 116 may be the sequence illustrated in FIG. 12, while the sequence illustrated in FIG. 13 may be initiated when a container of the type shown in FIG. 32 is mounted to blender base 100. In this manner, the food processing apparatus may permit one touch operation in conjunction with selective use of two or more containers. In other embodiments, a user may press a separate start (button to initiate operation) after pressing a button which selects a certain sequence.

Blade Embodiments

Figure 29:
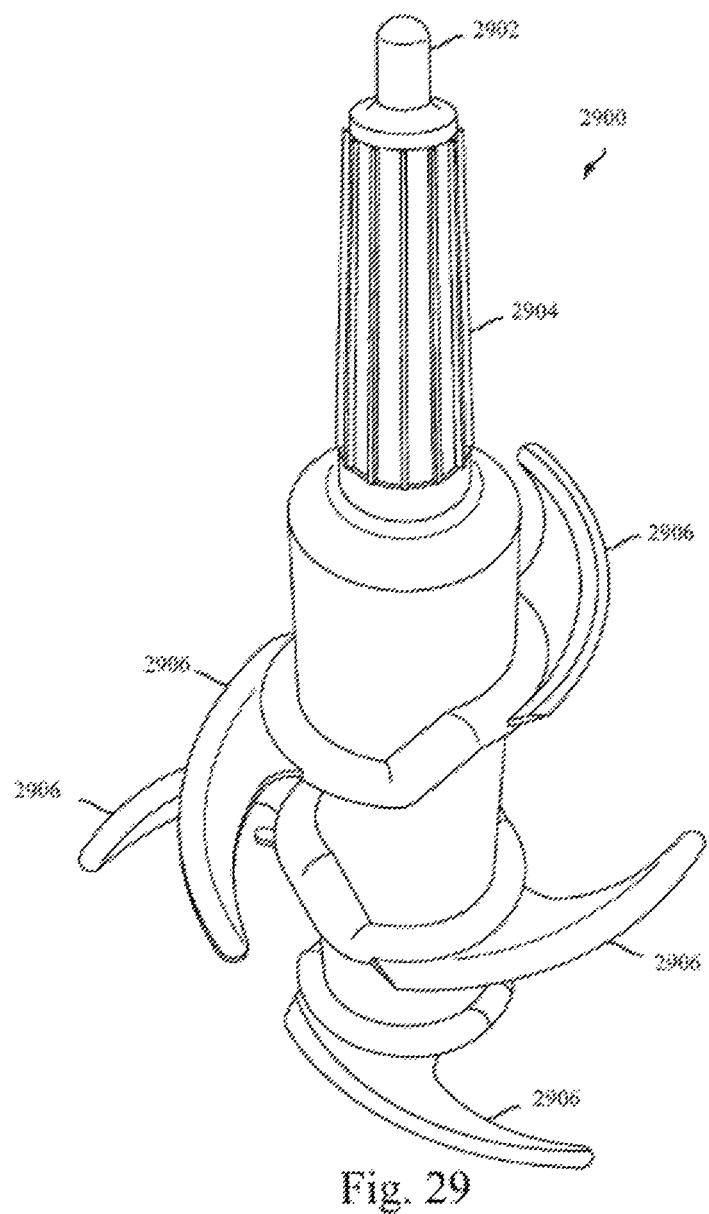
FIG. 29 is a top perspective view of a set of blades in accordance with one aspect.
Figure 30:
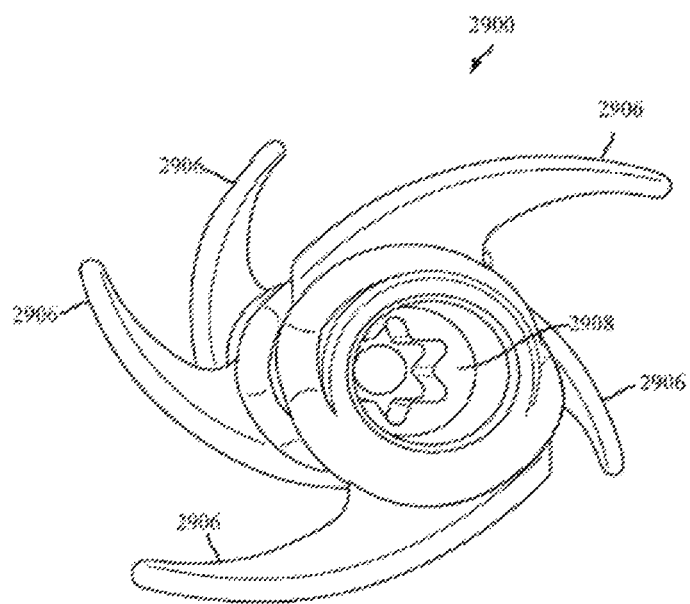
FIG. 30 is a bottom perspective view of a set of blades in accordance with one aspect.

FIGS. 29 and 30 illustrate one embodiment of a blade assembly 2900. As shown, the blade assembly 2900 has a shaft 2904 and a plurality of blades 2906, and the blades 1806 are arranged in sets of blades which are spaced apart along the length of the shaft 2904. In one illustrative embodiment, the blade assembly includes three sets of blades 2906, but it should be recognized that in another embodiment, the blade assembly may include a different number of sets of blades, for example one set, two sets, or four or more sets. In some embodiments, instead of sets of two blades, sets of blades with different numbers of blades (e.g., three or four blades per set) may be used. The blades 2906 may be removably attached to the shaft 2904 or permanently attached to the shaft 2904. For purposes herein, a set of blades is intended to mean two or more blades which are associated with each other in a manner other than being attached to the same shaft. For example, a set of blades may include two blades which have been cut from the same blank and attached to the shaft such that the two blades are made from a single piece of material and remain connect around the outside of the shaft. Or, in another example, a set of blades may include three blades which extend radially outwardly from the shaft in the different directions, but each at approximately the same vertical location on the shaft. In another example, a set of blades may include two blades extending radially outwardly from the shaft in the same direction but spaced vertically from one another without any other blades between the two blades. In yet another example, a set of blades may include two blades which extend outwardly from the shaft in opposite directions and located more closely with each other than with another blade on the shaft.

A first end 2902 of the blade assembly 2900 is configured to engage with the lid. More specifically, as shown, the first end 2902 of the blade assembly may include a pin or other protruding component configured to be inserted into a bushing (not shown) located on an underside of a container lid (see FIG. 31). It should be appreciated that the invention is not limited in this respect, and for example, in another embodiment, the first end 2902 of the blade assembly 2900 may include a recess component engageable with a protruding component on the lid, and/or the second end 2908 of the blade assembly 2900 may include a protruding component that is engageable with a recessed component on the container.

As shown in FIG. 30, a second end 2908 of the blade assembly may be configured to engage with a container. In this particular embodiment, the second end 2908 of the blade assembly includes a cavity that is configured to engage with a spindle (not shown) in the container. As shown, the second end 2908 of the blade assembly 2900 may include a pattern, such as a star-shaped pattern which engages with the shape of the spindle. Although a star-shaped pattern is illustrated, other configurations are also contemplated, such as, but not limited to, circular, triangular, square, rectangular, or hexagonal patterns.

It should be recognized that the blade assembly 2900 shown in FIGS. 29 and 30 may be used for various applications, such as, but not limited to cutting, slicing, dicing, and pureeing food within the container. In the illustrated embodiment, the blades 2906 have sharp leading edges which are rearwardly curved relative to the direction of rotation.

Container Embodiments

A 72 oz. container 3102 with an attached lid 3104 is shown mounted to blender base 100 in FIG. 31. A blade assembly 2900 similar to the blade assembly illustrated in FIGS. 29 and 30 is positioned within the container. Other sizes of containers may be used in various embodiments. Other blade arrangements or other processing tools may be used with containers that are mounted to blender base 100. In some embodiments, blade assemblies which include transmissions positioned within the container itself may be used in conjunction with blender base 100 and stored sequences that are used to operate the food processing apparatus.

FIG. 32 shows one illustrative embodiment of a food processing container 3202 which has blade assembly 3204 with two pairs of blades 3206, 3208. The food processing container may have a volume of approximately 56 oz. in some embodiments, though any suitable size may be used. A lid 3210, which may be lockable to the container in some embodiments, is also provided. As mentioned above, a transmission (not shown), such as a planetary gear assembly, may positioned underneath the container such that driving a driven coupler results in a slower rotational speed, but higher torque, of the processing tool as compared to the drive coupler.

Figure 33:
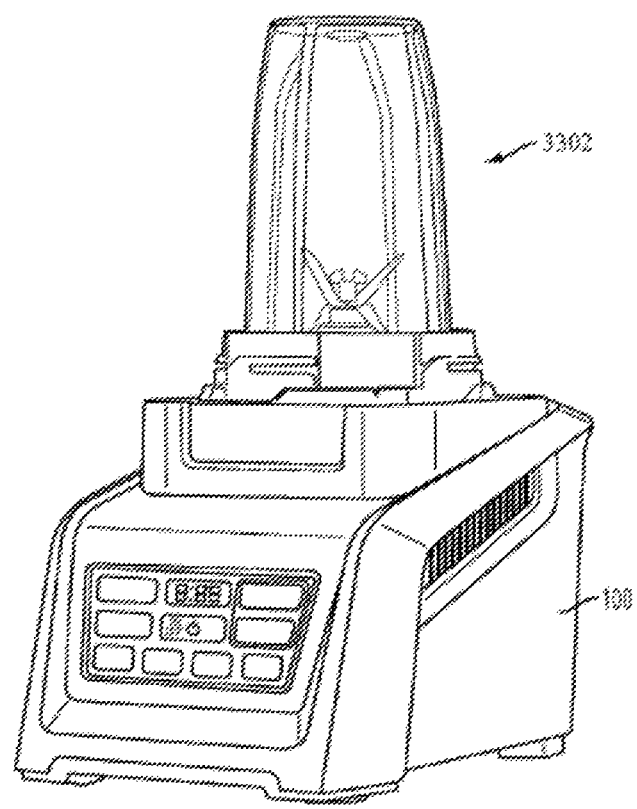
FIG. 33 is a perspective view of container attached to a blender base in accordance with one aspect.

FIG. 33 shows one embodiment of a personal serving container 3302 mounted to blender base 100. The container and blade assembly may be similar to the container and blade assembly shown in FIG. 3. In some embodiments, personal serving container 3302 may have a volume of 18 oz., while other embodiments may include a personal serving container with a volume of 24 oz. or 32 oz.

Controller

Figure 34:
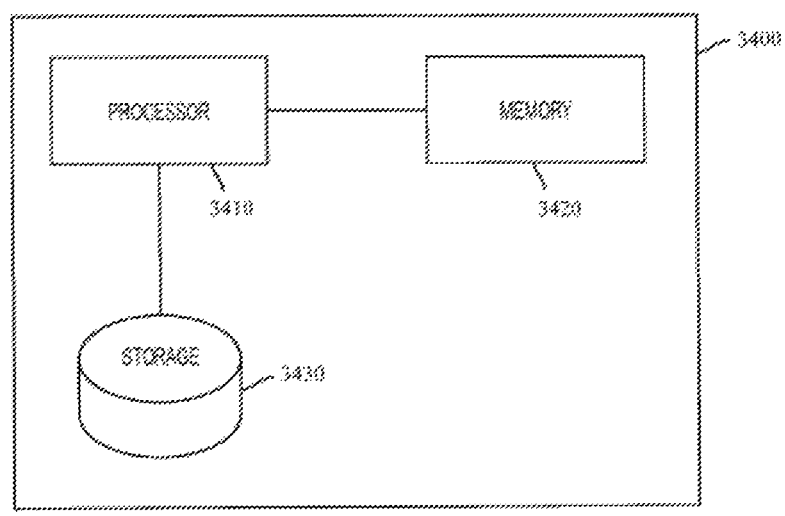
FIG. 34 is a block diagram of an illustrative controller that may be used in implementing some embodiments.

FIG. 34 is a block diagram of an illustrative embodiment of a computer system 3400 that may be used in one or more of the food processing apparatuses disclosed herein or used to perform one or more of the methods described herein, e.g., as a controller. Computer system 3400 may include one or more processors 3410 and one or more non-transitory computer-readable storage media (e.g., memory 3420 and/or one or more storage media 3430). The processor 3410 may control writing data to and reading data from the memory 3420 and the non-volatile storage device 3430 in any suitable manner, as the aspects of the invention described herein are not limited in this respect. The computer system 3400 also may include a volatile storage media.

To perform functionality and/or methods described herein, the processor 3410 may execute one or more instructions stored in one or more computer-readable storage media (e.g., the memory 3420, storage media, etc.), which may serve as non-transitory computer-readable storage media storing instructions for execution by the processor 3410. Computer system 3400 also may include any other processor, controller or control unit needed to route data, perform computations, perform I/O functionality, etc. For example, computer system 2500 may include any number and type of input functionality to receive data and/or may include any number and type of output functionality to provide data and/or audio and/or visual feedback to a user, and may include control apparatus to operate any present I/O functionality.

In connection with the food processing sequences and other food processing control described herein, one or more programs configured to receive user input(s), receive signals from one or more sensors, evaluate inputs, set run times and/or run speeds, and/or provide feedback and/or information to user may be stored on one or more computer-readable storage media of computer system 3400. Processor 3410 may execute any one or combination of such programs that are available to the processor by being stored locally on computer system 2500 or accessible over a network. Any other software, programs or instructions described herein may also be stored and executed by computer system 3400. Computer 3400 may be a standalone computer, server, part of a distributed computing system, mobile device, etc., and may be connected to a network and capable of accessing resources over the network and/or communicate with one or more other computers connected to the network.

Implementation of some of the techniques described herein using a computer system (such as computer 2500) is an integral component of practicing these techniques, as aspects of these techniques cannot be realized absent computer implementation. At least part of the inventors' insight is derived from the recognition that control of food processors in certain manners described herein can only be implemented using a computer system.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs which, when executed perform methods of the disclosure provided herein, need not reside on a single computer or processor, but may be distributed in a modular fashion among different computers or processors to implement various aspects of the technology described herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. Also, data structures may be stored in one or more non-transitory computer-readable storage media in any suitable form.

According to some embodiments, a user interface and/or controller may be partially or completely present on a wireless device which is physically separate from the food processing apparatus yet be considered as being a component of the apparatus. In some embodiments, all or a portion of the user interface may utilize a touchscreen interface or soft keys. Other examples of inputs for user interfaces include dials, switches, rotary knobs, slide knobs, voice-activated commands, virtual keyboards, or any other suitable input.

As used herein, the terms "connected," "attached," or "coupled" are not limited to a direct connection, attachment, or coupling, as two components may be connected, attached, or coupled to one another via intermediate components.

The above described components may be made with various materials, as the invention is not necessarily so limited.

The above aspects may be employed in any suitable combination, as the present invention is not limited in this respect. Additionally, any or all of the above aspects may be employed in a food processing apparatus; however, the present invention is not limited in this respect, as the above aspects may be employed to process materials other than food.

Having thus described several aspects of at least one embodiment of this invention, it is to be appreciated that various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A food processing apparatus comprising:
a container including at least one rotatable blade;
a drive unit having a drive coupler to rotate the at least one blade;
a controller to control the drive unit; and
at least one non-transitory memory storing processor-executable instructions that, when executed by the controller, cause the controller, in response to a first user input, to sequentially:
activate the drive unit for three seconds or less to rotate the drive coupler as a first pulse;
pause the drive unit for at least one second;
activate the drive unit for three seconds or less to rotate the drive coupler as a second pulse;
pause the drive unit for at least one second;
activate the drive unit for at least five seconds to rotate the drive coupler as a first blending segment;
pause the drive unit for at least one second;
activate the drive unit for at least five seconds to rotate the drive coupler as a second blending segment, wherein the second blending segment comprises a rapid acceleration of the drive unit to cause liquids and solids to surge briefly upwardly along an inner side wall of the container toward an upper end of the container to achieve a fountain effect sequence;
pause the drive unit for at least one second; and
activate the drive unit for at least five seconds to rotate the drive coupler as a third blending segment;

wherein a total time period of all activations of the drive unit that are at least five seconds for blending segments is at least twenty-three seconds.

2. The food processing apparatus as in claim 1, wherein the processor-executable instructions, when executed by the controller, cause the controller to activate the drive unit for three seconds or less to rotate the drive coupler as a third pulse and pause the drive unit for at least one second after the second pause and before the first blending segment.

3. The food processing apparatus as in claim 1, wherein a total time period of all activations of the drive unit that are at least five seconds are less than about fifty-two seconds.

4. The food processing apparatus as in claim 1, wherein a total time period of all pauses of the drive unit is at least ten seconds.

5. The food processing apparatus as in claim 1, wherein the activation of the drive unit for the first blending segment has a shorter length of time than the activation of the drive unit for each of the second and third blending segments.

6. The food processing apparatus as in claim 1, wherein the activation of the drive unit for the first blending segment lasts longer than the activation of the drive unit for each of the second and third blending segments.

7. The food processing apparatus as in claim 2, wherein the activation of the drive unit for the first blending segment is at least fifteen seconds, the activation of the drive unit for the second blending segment is at least twenty seconds, and the activation of the drive unit for the third blending segment is at least 16.5 seconds.

8. The food processing apparatus as in claim 7, wherein a total time period from a first activation of the drive unit until a last activation of the drive unit is seventy seconds or less.

9. The food processing apparatus as in claim 2, wherein the activation of the drive unit for the first blending segment is at least eight seconds, the activation of the drive unit for the second blending segment is at least 7.5 seconds, and the activation of the drive unit for the third blending segment is at least 7.5 seconds.

10. The food processing apparatus as in claim 9, wherein a total time period from a first activation of the drive unit until a last activation of the drive unit is forty seconds or less.

11. The food processing apparatus as in claim 1, wherein the activation of the drive unit for the first blending segment is at least five seconds, the activation of the drive unit for the second blending segment is at least thirteen seconds, and the activation of the drive unit for the third blending segment is at least fourteen seconds.

12. The food processing apparatus as in claim 11, wherein a total time period from a first activation of the drive unit until a last activation of the drive unit is forty-five seconds or less.

13. A food processing apparatus comprising:
a container including at least one rotatable blade;
a drive unit having a drive coupler to rotate the at least one blade;
a controller to control the drive unit; and
at least one non-transitory memory storing processor-executable instructions that, when executed by the controller, cause the controller, in response to a first user input, to sequentially:
activate the drive unit for three seconds or less to rotate the drive coupler as a first pulse;
pause the drive unit for at least one second;
activate the drive unit for three seconds or less to rotate the drive coupler as a second pulse;
pause the drive unit for at least one second;
activate the drive unit for three seconds or less to rotate the drive coupler as a third pulse;
pause the drive unit for at least one second;
activate the drive unit for at least five seconds to rotate the drive coupler as a first blending segment;
pause the drive unit for at least one second; and
activate the drive unit for at least five seconds to rotate the drive coupler as a second blending segment, wherein the second blending segment comprises a rapid acceleration of the drive unit to cause liquids and solids to surge briefly upwardly along an inner side wall of the container toward an upper end of the container to achieve a fountain effect sequence;
wherein a total time period of all activations of the drive unit that are at least five seconds for blending segments is at least nineteen seconds.

14. The food processing apparatus as in claim 13, wherein the activation of the drive unit for the first blending segment is at least eight seconds and the activation of the drive unit for the second blending segment is at least eleven seconds.

15. The food processing apparatus as in claim 14, wherein a total time period from a first activation of the drive unit until a last activation of the drive unit is thirty-five seconds or less.

16. The food processing apparatus as in claim 13, wherein the processor-executable instructions, when executed by the controller, cause the controller to activate the drive unit for three seconds or less to rotate the drive coupler as a fourth pulse and pause the drive unit for at least one second at a time after the third pause and before the first blending segment.

17. The food processing apparatus of claim 16, wherein the activation of the drive unit for the first blending segment is at least 8.5 seconds and the activation of the drive unit for the second blending segment is at least eleven seconds.

18. The food processing apparatus as in claim 17, wherein a total time period from a first activation of the drive unit until a last activation of the drive unit is forty seconds or less.

19. The food processing apparatus of claim 16, wherein the activation of the drive unit for the first blending segment is at least twenty-five seconds and the activation of the drive unit for the second blending segment is at least sixteen seconds.

20. The food processing apparatus as in claim 19, wherein a total time period from a first activation of the drive unit until a last activation of the drive unit is sixty seconds or less.

21. A food processing apparatus comprising:
a container including at least one rotatable blade;
a drive unit having a drive coupler to rotate the at least one blade;
a controller to control the drive unit; and
at least one non-transitory memory storing processor-executable instructions that, when executed by the controller, cause the controller, in response to a first user input, to sequentially:
activate the drive unit for three seconds or less to rotate the drive coupler as a first pulse;
pause the drive unit for at least one second;
activate the drive unit for three seconds or less to rotate the drive coupler as a second pulse;
pause the drive unit for at least one second;
activate the drive unit for at least five seconds to rotate the drive coupler as a first blending segment;
pause the drive unit for at least one second;

activate the drive unit for three seconds or less to rotate the drive coupler as a third pulse;
pause the drive unit for at least one second;
activate the drive unit for at least five seconds to rotate the drive coupler as a second blending segment, wherein the second blending segment comprises a rapid acceleration of the drive unit to cause liquids and solids to surge briefly upwardly along an inner side wall of the container toward an upper end of the container to achieve a fountain effect sequence;
pause the drive unit for at least one second; and
activate the drive unit for at least five seconds to rotate the drive coupler as a third blending segment;
wherein a total time period of all activations of the drive unit that are at least five seconds for blending segments is at least fifty-two seconds.

22. The food processing apparatus as in claim 21, wherein the activation of the drive unit for the first blending segment is at least ten seconds, the activation of the drive unit for the second blending segment is at least twenty seconds, and the activation of the drive unit for the third blending segment is at least 22.5 seconds.

23. The food processing apparatus as in claim 22, wherein a total time period from a first activation of the drive unit until a last activation of the drive unit is seventy seconds or less.

24. A food processing apparatus comprising:
a container including at least one rotatable blade;
a drive unit having a drive coupler to rotate the at least one blade;
a controller to control the drive unit; and
at least one non-transitory memory storing processor-executable instructions that, when executed by the controller, cause the controller, in response to a first user input, to sequentially:
activate the drive unit for three seconds or less to rotate the drive coupler as a first pulse;
pause the drive unit for at least one second;
activate the drive unit for three seconds or less to rotate the drive coupler as a second pulse;
pause the drive unit for at least one second;
activate the drive unit for three seconds or less to rotate the drive coupler as a third pulse;
pause the drive unit for at least one second;
activate the drive unit for at least five seconds to rotate the drive coupler as a first blending segment;
pause the drive unit for at least one second;
activate the drive unit for three seconds or less to rotate the drive coupler as a fourth pulse;
pause the drive unit for at least one second;
activate the drive unit for three seconds or less to rotate the drive coupler as a fifth pulse;
pause the drive unit for at least one second;
activate the drive unit for at least five seconds to rotate the drive coupler as a second blending segment;
pause the drive unit for at least one second; and
activate the drive unit for at least five seconds to rotate the drive coupler as a third blending segment;
wherein a total time period of all activations of the drive unit that are at least five seconds for blending segments is at least forty-seven seconds.

25. A food processing apparatus as in claim 24, wherein the activation of the drive unit for the first blending segment is at least nine seconds, the activation of the drive unit for the second blending segment is at least twenty seconds, and the activation of the drive unit for the third blending segment is at least 18.5 seconds.

26. The food processing apparatus as in claim 24, wherein a total time period from a first activation of the drive unit until a last activation of the drive unit is seventy-five seconds or less.

27. A method used in connection with operation of a food processing apparatus, the apparatus comprising a drive unit having a drive coupler to drive a food processing assembly, a controller to control the drive unit, and at least one non-transitory memory storing processor-executable instructions that are executable by the controller to cause the controller to control the drive unit, the method comprising:
in response to a first user input, sequentially:
activating the drive unit for three seconds or less to rotate the drive coupler as a first pulse; pausing the drive unit for at least one second;
activating the drive unit for three seconds or less to rotate the drive coupler as a second pulse;
pausing the drive unit for at least one second;
activating the drive unit for at least five seconds to rotate the drive coupler as a first blending segment;
pausing the drive unit for at least one second;
activating the drive unit for at least five seconds to rotate the drive coupler as a second blending segment, wherein the second blending segment comprises a rapid acceleration of the drive unit to cause liquids and solids to surge briefly upwardly along an inner side wall of the container toward an upper end of the container to achieve a fountain effect sequence;
pausing the drive unit for at least one second; and
activating the drive unit for at least five seconds to rotate the drive coupler as a third blending segment;
wherein a total time period of all activating of the drive unit for at least five seconds for blending segments is at least twenty-three seconds.

* * * * *